United States Patent
Lof et al.

(10) Patent No.: US 7,430,534 B2
(45) Date of Patent: Sep. 30, 2008

(54) SYSTEM, METHOD AND COMPUTER PROGRAM PRODUCT FOR RISK-MINIMIZATION AND MUTUAL INSURANCE RELATIONS IN METEOROLOGY DEPENDENT ACTIVITIES

(75) Inventors: Per-Anders K. Lof, Vallingby (SE); Lars Gustaf I. Gertmar, Vasteras (SE); Lars Anders T. Andren, Orsundsbro (SE); Frans Lundquist, Stockholm (SE); Peter Wigert, Stockholm (SE)

(73) Assignee: ABB AB, Vasteras (SE)

( * ) Notice: Subject to any disclaimer, the term of this patent is extended or adjusted under 35 U.S.C. 154(b) by 1347 days.

(21) Appl. No.: 10/023,899

(22) Filed: Dec. 21, 2001

(65) Prior Publication Data

US 2002/0194113 A1 Dec. 19, 2002

Related U.S. Application Data

(60) Provisional application No. 60/289,142, filed on Jun. 15, 2001.

(51) Int. Cl.
*G06Q 40/00* (2006.01)
(52) U.S. Cl. ............................ 705/37; 705/35; 705/22; 705/412
(58) Field of Classification Search ............... 705/36 R, 705/35–45, 22
See application file for complete search history.

(56) References Cited

U.S. PATENT DOCUMENTS

| | | | |
|---|---|---|---|
| 4,400,659 A | | 8/1983 | Barron et al. |
| 4,556,801 A | | 12/1985 | Gervasio et al. |
| 6,320,272 B1 | | 11/2001 | Lading et al. |
| 6,321,212 B1 * | | 11/2001 | Lange ...................... 705/36 R |
| 2002/0029097 A1 * | | 3/2002 | Pionzio et al. ............. 700/286 |
| 2002/0120555 A1 * | | 8/2002 | Lerner ........................ 705/37 |

FOREIGN PATENT DOCUMENTS

WO   WO 01/77525   10/2001

OTHER PUBLICATIONS

Implementing Short-term Prediction at Utilities, L. Landberg et al, Final Report to the European Comission, Non Nuclear Energy Programme, JOULE III, Jan. 1996 to Dec. 1998, pp. 1-16.

Implementation of Short-Term Prediction, L. Landberg et , 1999 European Wind Energy Conference, Nice, France Mar. 1-5, 1999, pp. 57-62.

(Continued)

*Primary Examiner*—James P. Trammell
*Assistant Examiner*—Kirsten S Apple
(74) *Attorney, Agent, or Firm*—Oblon, Spivak, McClelland, Maier & Neustadt, P.C.

(57) ABSTRACT

A system, method and computer program product for minimizing risks associated with meteorology dependent activity. Such activity may include operation of renewable power sources and the delivery of power output from those renewable sources for sale on a market. The system and method identify risks to market participants in the event of possible shortfall, and provide metrics and mitigation processes for addressing the risks before the contractual breaches occurs for failure to deliver power, or imbalances occurred in grid operations.

3 Claims, 22 Drawing Sheets

OTHER PUBLICATIONS

Short-Term Wind Forecasting, Development and Application of a Mesoscale Model, Bruce Bailey et al, 1999 European Wind Energy Conference, Nice, France, Mar. 1-5, 1999, pp. 1062-1065.

Investigation of the Effects of Wind Speed Forecasts and Economic Evaluation of the Increased Penetration of Wind Energy for the Island of Crete, E. Akylas et al, 1999 European Wind Energy Conference, Nice, France, Mar. 1-5, 1999, pp. 1074-1077.

Advanced Short-Term Forecasting of Wind Power Production, G. Kariniotakis et al, European Wind Energy Conference, Dublin Castle, Ireland, Oct. 1997, pp. 751-754.

Statistical Methods for Predicting Wind Power, Torben Skov Nielsen et al, European Wind Energy Conference, Dublin Castle, Ireland, October, 1997, pp. 755-758.

Experiences with Statistical Methods for Wind Power Prediction, T. S. Nielsen, et al, 1999 European Wind Energy Conference, Nice, France, Mar. 1-5, 1999, pp. 1066-1069.

Short-Term Prediction of wind Speed and Power Output of a Wind Turbine with Neural Networks, H. G. Beyer at al, 1994 European Wind Energy Association Conference and Exhibition, Thessaloniki, Greece, Oct. 10-14, 1994, pp. 349-352.

Can Wind Power be Sold in a Deregulated Electricity Market?, Bent Sorensen et al, 1999 European Wind Energy Conference, Nice, France, March 1-5, 1999, pp. 375-378.

Growth Potentials of Wind Power in a Liberalized Energy Market, Ferdinand Lutz et al, 1999 European Wind Energy Conference, Nice, France, Mar. 1-5, 1999, pp. 508-511.

Ikke-Regulerbar Prodktion I Nordel-Systemet, Nordels Arsmode 2000, Nordels Netgruppe, Maj 2000 with attached English translation.

U.S. Appl. No. 10/023,899, filled Dec. 21, 2001, U.S. Patent Appl. No. 2002-0194113, Lof et al.

U.S. Appl. No. 11/045,313, filed Jan. 31, 2005, Lof et al.

* cited by examiner

Relationship of VES pricing to meterological forecast probability values

Calculation of WF risks in options and VES

Calculation of Hydro's risks in VES
Volume risk in VES
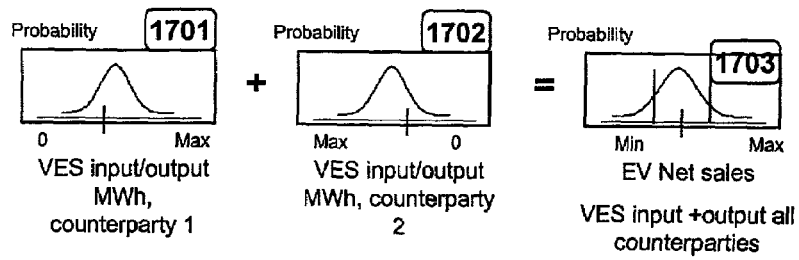
Price risk in VES
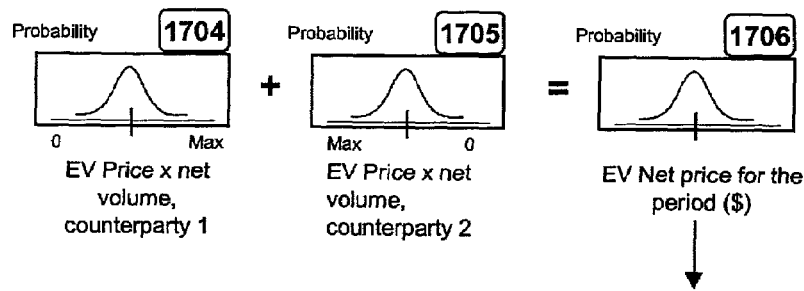
The pdf for net price for each period is discounted to present value and summed to a total uncertainty
Risk of non optimal usage of hydro storage, due to spill of water and selling on non-preferred hours
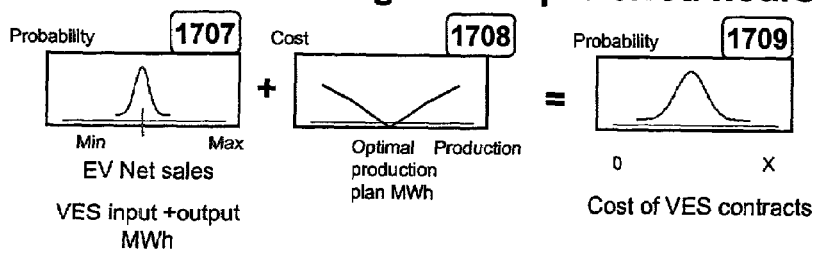
Figure 17

SYSTEM, METHOD AND COMPUTER PROGRAM PRODUCT FOR RISK-MINIMIZATION AND MUTUAL INSURANCE RELATIONS IN METEOROLOGY DEPENDENT ACTIVITIES

CROSS-REFERENCE TO RELATED PATENT APPLICATIONS

The present document contains subject matter related to that disclosed in commonly owned, co-pending application Ser. No. 09/749,999 filed Dec. 29, 2000, entitled SYSTEM, METHOD AND COMPUTER PROGRAM PRODUCT FOR ENHANCING COMMERCIAL VALUE OF ELECTRICAL POWER; application Ser. No. 09/838,178 filed Apr. 20, 2001, entitled SYSTEM, METHOD AND COMPUTER PROGRAM PRODUCT FOR ENHANCING COMMERCIAL VALUE OF ELECTRICAL POWER; application Ser. No. 09/839,220 filed Apr. 23, 2001, entitled SYSTEM, METHOD AND COMPUTER PROGRAM PRODUCT FOR ENHANCING COMMERCIAL VALUE OF ELECTRICAL POWER; application Ser. No. 09/881,001 filed Jun. 15, 2001, entitled SYSTEM, METHOD AND COMPUTER PROGRAM PRODUCT FOR ENHANCING COMMERCIAL VALUE OF ELECTRICAL POWER; application Ser. No. 09/900,874 filed Jul. 10, 2001, entitled SYSTEMS, METHOD, ROTATING MACHINE MEANS AND COMPUTER PROGRAM PRODUCT FOR ENHANCING ELECTRIC, the entire contents of each of which is being incorporated herein by reference. The present application also claims the benefit of the earlier filing date of U.S. Provisional Application Ser. No. 60/298,142, filed Jun. 15, 2001, entitled SYSTEM AND METHOD FOR RISK-MINIMIZATION AND MUTUAL INSURANCE RELATIONS IN METEOROLOGY DEPENDENT ACTIVITIES, the entire contents of which being incorporated herein by reference.

BACKGROUND OF THE INVENTION

1. Field of the Invention

The present invention relates to industrial and societal systems and methods whose performance is affected by a dependency on meteorological data, as well as a stochastic nature of variations in Earth's atmosphere-ocean system. More particularly, the present invention relates to computer-based systems, methods and computer program product that aid in minimizing system performance risks due to meteorological influence for all systems, such as renewable power production facilities, that have a final product or service that is influenced by meteorological variation and meteorological prediction error.

2. Discussion of the Invention

Due to an inability to control wind currents, and a prevailing disbelief that wind speeds can be predicted accurately over any appreciable period of time, electricity from wind power systems is viewed by system operators and power exchanges as being an unreliable source of power, when compared with fossil fuel facilities or hydro facilities, for example. It is most convenient, for planning purposes, to expect power producers to comply with delivery contracts 100% of the time. The predictability of meteorological and oceanographic parameters varies strongly with conditions in these geophysical systems. Consequently, power provided from renewable power production facilities (wind turbine facilities, tidal facilities, solar facilities and the like) are at a disadvantage when it comes to trading power, since there is an inherent uncertainty regarding whether the power will actually be delivered, at a pre-specified time of delivery. Also, the impact of prediction errors on the meteorology dependent activities vary, thus further complicating the reliability of power from renewable sources, especially ones whose production has significant short-term stochastic variability. More generally, examples of activities where a risk follows from prediction uncertainties include the following:

Electrical power production from time-varying wind, solar, wave, ocean currents, and tidal sources that include Production optimization; Maintenance scheduling; Transmission load; Energy trading; Capital investment costs; and Load shedding;

Designation of flight routes for commercial airlines: Jet-stream position; Alternative routes; and Optimal flight path;

Airport operation and issuing of landing permits in severe weather conditions to include: Back-up transportation methods and resources; and Connecting flights problems—chain of reactions; Global courier mail services where choices of delivery method and path are time-critical to include: Fastest route; Alternative methods; and Guarantee of delivery;

Agricultural activities to include: Harvesting crops; Open-air drying of hay; and Fertilizing periods; and Transportation at sea to include: Avoiding severe weather at sea; Going in to harbor; Docking tankers with oil production platforms; and Towing large structures such as offshore platforms and wind turbine blades.

As recognized by the present inventors, a limitation with conventional wind power systems is that unless there is some physical media for storing the electrical power (actually energy) at the local generation facility, conventional systems cannot reliably perform in either the balance regulation or the longer term power exchange, e.g., Nord Pool, due to variability of the wind power. Local storage media is expensive, as compared with other generation systems that are able to control the amount of fuel or energy expended to produce a predetermined amount of electrical power. Thus, conventional wisdom in the power industry is that the wind power systems will require substantially more capital to build (on a per/kW output basis) than other systems, in part because the wind power systems are believed to either require a substantial local energy storage facility, or will suffer from being an inherently unreliable source of electric power.

In an article by Söder L., "The Operation Value of Wind Power in the Deregulated Swedish Market", Royal Institute of Technology, Sweden, Nordic Wind Power Conference Mar. 13-14, 2000, page 5, paragraph 4.1.3, it is explained that for wind power the construction of the exchange makes it difficult to put bids. The bids on Nord Pool have to be put 12 to 36 hours in advance of real delivery. Söder reflects conventional thoughts about the absence of wind power as a fungible asset by stating that this 12 to 36 hour lead time makes it in reality nearly impossible to trade wind power bids since the forecasts normally are too bad for this time. The difficulty of selling wind power because of the unstable nature of the wind is also recognized by Lutz and Weller (pp. 508-511, 1999, European Wind Energy Conference). Thus, while wind power is generally recognized as an environmentally friendly type of power, it is not believed to be as commercially valuable or fungible as other types of electricity such as that generated by fossil fuels.

Hammons, et al. in "Renewable Energy Alternatives for Developed Countries", IEEE Transactions on Energy Conversion, Vol. 15, No. 4, December 2000, when analyzing the market for 'green' energy, states that "[t]he green pool does not aim to meet the instantaneous demand of its customers.

Even a portfolio of green generators would be unable to exactly meet the instantaneous power demand of its consumers at every instant, and, as a result, the green pool will have to purchase top-up electricity when demand exceeds generation and conversely sell excess (spill) electricity when generation exceeds demand. Consequently, even if the number of kWh generated over a year equal the demand, there will still be a cost associated with trading of spill and top-up."

In order to appreciate how a Power Exchange (PX) operates, a short discussion is in order. Nord Pool is described in the present example, although this is just one example of a PX.

Nord Pool Financial Markets

Financial markets offer a trading place for price hedging and risk management. Participants in the power market can use the financial market to hedge sales and purchases for power. Financial electricity contracts and options are instruments for risk management and budgeting of future proceeds and expenses associated with power sales and power purchases.

A financial contract period includes price hedging of a certain amount of power during a fixed time period. Participants who assume a purchase or sale position are guaranteed the agreed-upon price for purchase or sale of the equivalent amount of power on Elspot, which is Nord Pool's market for trade in power contracts for physical delivery. The contract price hedges a fixed amount of power, the same for all hours, during the contract period.

There are two main categories of Eltermin contracts: Futures and Forwards. The contract types differ as to how settlement is carried out during the trading period, i.e. until their due date (settlement week). The same profit and risk profile applies, whether one trades in Futures Contracts or Forward Contracts.

For Futures Contracts, the value of each Participant's contract portfolio is calculated daily, reflecting changes in the market price of the contracts. The daily changes in value are settled financially between the buyer and the seller. Through this process, a portfolio manager can quickly identify and realize losses as well as profits.

For Forward Contracts, there is no cash settlement until the start of the delivery period. Forward settlement "accumulates" daily during the entire trading period and is realized in equal shares every day in the delivery period. Any unrealized profit (positive accumulated forward settlement) for a product series is applied to reduce the security requirement. A participant's daily security requirement consists of minimum security, margin requirement; plus any unrealized losses (negative accumulated forward settlement) minus unrealized profit (positive accumulated forward settlement).

An option is a contract with an asymmetrical risk, which means that different conditions apply for the contracted parties. When combined, options and financial contracts open up for increased possibilities to distribute and manage risk associated with power trade. The possibility to price hedge and limit risk at the same time is improved. Eloptions can be used to "hedge" a power portfolio against a drop or to increase the return of a portfolio. They can also be used to establish a so-called "caps and floor price". Irrespectively of whether the value of the underlying product increases, drops, or remains constant there are profits to be made.

Trade may be conducted via Nord Pool's electronic trading system or by bidding via telephone (to the help desk function at Nord Pool). Settlement and delivery are carved out as financial price-hedging settlements without any physical delivery of power. Nord Pool has established a system that allows Clearing Customers to trade and clear Financial Power Contracts through Participants who have been authorized as Trading and Clearing Representatives (brokers).

Publications have been presented related to the impact of power production forecast errors in power systems with significant penetration of wind energy. These have been triggered by the aggressive plans of offshore wind energy farm installations in e.g. Denmark, as well as by the impact of wind energy in the power system on the island of Crete.

Nord Pool Eloptions

Options are financial derivative products that are well suited to markets such as the power market, in which there is volatility and price risk—and thus a need for price hedging.

Electric power options, which are traded on the Nordic Power Exchange's Financial Market, are used to manage risk and forecast future income and costs related to trading in electric power contracts. The combined use of electric power options and forward and futures contracts offers greater opportunities for spreading and handling risk associated with power trading.

Electric power options may be used to secure a power portfolio against price declines or increases, or to increase a portfolio's yield.

The electric Power options traded at Nord Pool include European-style Power Options (EPO) and Asian-style Power Options (APO). The power options traded at Nord Pool are standardized, and thus governed by pre-determined option contract specifications. A key difference between EPOs and APOs is that European-style-exercise power options have underlying instruments, whereas Asian-style-exercise power options are settled retroactively against the arithmetic average Elspot system price during a specified period.

Due to market demand, electric Power options were introduced at the Nordic Power Exchange. These options represent an important element in the Power Exchange's expanding product line. The standardization that now applies to the types of options that are most liquid in the Nordic power market was a precondition for the introduction of these options. Trade in power options has been included in the Nord Pool financial market since the autumn of 1999.

Wins Energy Production Prediction Background

The general usefulness of meteorological and statistical forecasts of power production has been established. Thus, Jensen, Pelgrum, and Madsen, (pp 353-356, European Wind Energy Conference 1994) state that "The economic benefit will come from the situation with normal operation conditions where a good wind power prediction with e.g. 12-hour horizon will enable the operators to take into account the wind production on beforehand, instead of regulating the running units as a consequence of an experienced wind production". In isolated power production and consumption systems planning is typically over a few hours, while utilization of spinning reserves is planned in shorter intervals of say 15 minutes. In larger scale systems connected via transmission grids, planning is typically done on time-scales of the order of days to months and spinning reserve utilization done on one half hour to an hour time-horizon (Kariniotakis et. al., pp 1082-1085, European Wind Energy Conference 1999). By accurate wind power forecasting the additional spinning reserve due to wind power unpredictability can be reduced.

The choice of prediction method depends on the time horizon of the needed forecast. Today generally statistical methods perform better on time horizons out to about 4 hours whereas for longer forecast periods methods utilizing numerical meteorological weather forecast models are superior.

Nielsen and Madsen, (pp 755-758 European Wind Energy Conference 1997) combines statistical models based on autoregression with meteorological forecasts and states that the meteorological forecast data is of little value below 4 hours forecast. For 3 to 24 hours ahead the reduction, relative to persistence, in standard deviation in prediction error was increasing from 13.7% to 35.6%.

Bossanyi E. A. (Wind Engineering, Vol. 9, No. 1, 1985) shows that Kalman filtering performs best for 1-minute average wind speed where a 10% reduction in rms error relative to persistence was found. Site dependency of the results was noted. Beyer et.al. (pp 349-352, European Wind Energy Conference 1994) applies Neural Network methods to 1 minute and 10 minute forecasts. They found that a 10% improvement in prediction RMS error is easily obtained relative to persistence. Simple schemes were doing just as well as more complex schemes speaking in favor of fast and simple methods.

Evaluations of prediction accuracy for methods based on numerical meteorological models clearly depend on the quality of the underlying meteorological data assimilation and forecasting system. Beyer, Heinemann, Mellinghoff, Monnich, and Waldl, (pp 1070-1073 European Wind Energy Conference 1999) shows that the RMS error is of order 15% for predictions based on a combination of numerical meteorological forecast model and geostrophic drag-law+similarity wind profile using every 6 hour forecasts out to 48 hours prediction. No significant difference between 6 and 24 hours where found. Larger errors, of up to 25-30% RMS, where found for 48 hours predictions. For regional predictions, covering northern Germany, the RMS is below 10% up to 24 hours in advance.

Akylas, Tombrou, Panourgias, and Lalas (pp 329-332 European Wind Energy Conference 1997) found 20-25% improvement relative to persistence prediction for out to 24-hour forecasts at three sites on Crete, with difficult terrain.

Landberg (pp 747-749 European Wind Energy Conference 1997) shows that the DMI-Risoe model system (termed WPPT) predicts power output for a wind energy farm with an error less than 10% for ranges between 1-36 hours. Landberg (pp 1086-1089 European Wind Energy Conference 1999) shows that the mean absolute error of the DMI-Risoe prediction system is 15% of installed capacity (10% for 'good' sites and 20% for 'bad' sites). Shifting from using a geostrophic drag law to using instead the predicted speed at 10 m height decreases standard deviations in wind error by 20%. Given 20% improvement in wind error standard deviation, wind power standard deviation improvement would be even better.

Watson, Landberg, and Halliday (IEE Proc. Gener. Transm. Distrib., Vol 141, No. 4, July 1994) examined the financial gains from various levels of wind power penetration in the England and Wales national grid. During the simulated fiscal year 1989/90 the load ranged from 14 GW to 47 GW. Total installed power production capacity was of order 70 GW. A wind power capacity ranging from 5 to 40 GW was examined. The difference between a perfect forecast and a meteorological/statistical forecast in terms of fossil fuel savings may be seen as a measure of the cost associated with predictability and risk. For 10 GW this difference was by Watson et. al. found to be of order 30 Million £, increasing to about 200 Million £ at 20 GW and to 700 Million £ at 30 GW, and of the order of 1230 Million £ at 40 GW installed wind power.

The 15% RMS error stated by Landberg (pp 1086-1089 European Wind Energy Conference 1999) corresponds to 150 MW for a 1 GW installation. The market value of a 150 MW prediction error would, e.g. in the Nordic market, correspond to 720.000 NOK/day for a typical Nord Pool price level of about 200 NOK/MWh.

Meibom and Sorensen (pp 375-378 332 European Wind Energy Conference 1999) (Sorensen and Meibom, Renewable Energy 16 (2399) 878-881), concludes that the Danish ENERGY 21 plan (37% wind power penetration in Denmark), with bidding on Nord Pool, results in a 12% average cost of incorrect bidding. The cost following from having to complement the amount actually delivered via the balance market. For a trading price of 200 DKK per MWh and an installed wind energy production capacity of about 20000 GWh per year we get a total cost of incorrect bidding if all wind power is sold on Nord Pool of 480 million DKK a year. According to this scenario a one percent power production prediction improvement thus has a monetary value of about 4.8 million DKK. This may also be seen as a measure of the value of the risk taken by providing a possibly erroneous prediction.

The impact of forecast errors is, as recognized by the present inventions, clearly larger the larger the wind power penetration is in the system. It follows that the risk also increases and as a result the need for insurance for the partners involved in financing, operating and using the power production system. Watson's et. al. analysis is based on a system without hydropower, together with an assumption that nuclear power cannot be turned off at will. As a result, the fraction of the total available wind power that has to be discarded increases with installed capacity of wind power. Since a hydrogenerator has a significantly shorter response time than a nuclear plant, it should be stated that in a hydro-power-dominated grid this negative effect would not be present to the same extent. Watson et. al. also analyzes the importance of load shedding on the operations and savings. They find that savings increase with the allowance of loss of load events. They conclude their study by noting that there is a cost penalty related to wind power relative to conventional power sources for wind energy penetrations above roughly 15%.

Present meteorological forecasting techniques gives, according to the above studies, 15-25% more fossil fuel savings than what a simple persistence forecast would allow. In addition to the fossil fuel savings, optimal operation of wind energy production also lead to a decreased need of spinning reserve and consequently lower capital investment costs for such systems. Shedding wind turbines due to grid balance requirements is clearly a waste of both fuel resources and the capital cost associated with the turbines. As explained in co-pending U.S. application Ser. No. 09/749,999, an efficiently operated market where wind energy is of premier quality and grid balancing can be achieved by saving potential energy in hydro power systems is clearly attractive.

Energy management systems with load and production monitoring, prediction and scheduling, such as e.g. CARE developed within the EU Joule III project, are available. However, they do not include financial risk management features, nor any guidance to market actors on whether to supplement predicted production in order to meet contractual obligations.

The Need for Reducing Risk in Energy Systems Via Risk Management (RM)

As previously described, risk stems from several sources in the energy system. Regarding wind power, wind predictability is the largest source of risk. Reducing risk is of interest to several participants, producers, consumers, system operator (TSO) and suppliers of information to the system. To understand the present invention, a basic review of financial risk management is in order. Examples of risk management perspectives found in "The J. P. Morgan/Arthur Andersen Guide to Corporate Risk Management", 1997, Risk Publications chapter 2, pp 7-12.include:

RM from the investor perspective—Investors seek a risk-adjusted return on capital invested. High risks require a higher return on investments. Reduced risk enables investors to require less return on the same level of investment. Lower risk attracts more investors, therefore a lowered risk through RM is positive for the value of the company.

Cost of financial distress—Cost of financial distress means the risk of a loss leading to a possible bankruptcy. RM is used to minimize the risk of that loss.

Debt capacity and the cost of debt—RM can ensure that debt can be repaid and interest rates can be paid, despite volatile prices of goods purchased or sold.

Investment capacity and the availability of internal capital—Through RM it is possible to finance future investments internally, since operations with lower risk requires less working capital.

Return on risk capital—RM enables companies to use less capital for future periods with uncertain levels of the cash flow. Risk capital is in many cases more expensive than using a RM hedging strategy.

In identifying risks, there are three major sources of risk in a company:

Transaction exposure which reflects the effects of a price change in quantities bought or sold. Could be the effect of a change in exchange rate or electricity price on future cash flow;

Economic exposure which reflects future losses due to a relative change in the company's competitiveness compared to similar goods. Could be the change in competitiveness if a currency appreciates or if new investments are more efficient than the company's;

Translation exposure which reflects if a company holds assets in a foreign country and a change in exchange rate decreases the local value of the assets.

Valuation of risk describes how market movements have affected the value of an asset or a contract (i.e., The Portfolio). Comparing the market price of the asset or contract to the purchase or sales price does this. The result is the current profit or loss of the asset or contract if sold today.

Measuring risk is a process of assessing risk in which one tries to look forward to how market movements could affect the values of an asset or a contract in the future. The methods involve trying to estimate the sensitivity in market value of a portfolio to changes in market prices. Often a probability of the result is used. Several methods are used to measure risk:

Sensitivity analysis—the purpose is determine the Portfolio's change in value due to a $ or % change in price of the Portfolio's content. The $ or % change is determined through historical price movements; and Value at Risk (Risk Metrics)—Value at Risk (VaR) describes the maximum expected loss, with a specified confidence interval, of the Portfolio's value resulting from an adverse price movement that could occur in normal markets over a defined unwind period.

A common version under statistical assumptions is VaR=Market value of position ×Position volatility×SQRT (unwind period, the period it takes to close the exposure). VaR takes into correlation the degree to which different market prices move in tandem or not. The following formula takes account of correlation's when measuring combined effects of two risks:

$$VaR = \sqrt{[VaR(1)^2 + VaR(2)^2 + 2(\rho_{12} VaR(1) VaR(2))]}$$

VaR can also be estimated with a simulation methodology (e.g., Monte Carlo simulation) where probability density functions of future prices are used. One starts with a portfolio including one or several contracts or assets. The possible observations of each portfolio item's price are described by a probability density function (pdf) where correlations are also included. An observation is drawn and the market value of the portfolio is calculated. 20 Multiple observations are drawn and the possible outcome of the portfolio's value can be described by a pdf. 1000 to several 100000 price observations can be used.

Risk willingness is also another factor in risk management. Better data improves risk willingness. When choosing between risk and potential, maximum payoff should be targeted under desired risk level. In FIG. 15, different points on the efficient front are plotted. It shows the expected payoff increasing and risk decreasing when moving from point 1 to point 2, possibly through a risk management decision. Moving from point 2 to point 3 gives higher profit at the same risk level, for any one a desirable movement, also through a risk management decision. To move from point 3 to 4, there is an equal change in payoff and risk, which is desirable for anyone but the risk averse. The risk lover would also appreciate the move from point 4 to 5, because of the increasing payoff, even though there is an even more increasing risk.

SUMMARY OF THE INVENTION

The risks, financial as well as operational, associated with activities like the ones above, give rise to an interest in performing risk assessment so as to ensure that the underlying business (whether in renewable power generation, or not) remains sound despite the variability of operational conditions. Involved parties also need appropriate mechanisms and methods to insure themselves against costs related to unexpected meteorological scenarios. Risk assessment becomes a central part in a portfolio established to handle risks associated with prediction uncertainties of the state of the atmosphere and ocean. One feature of this invention is a system for mutually insuring/assuring partners in a business activity dependent on meteorological information.

A specific feature of the invention is a system for risk handling and assuring partners in a power production system that the contracted power will in fact be delivered on schedule and in the appropriate quantity despite the fact that the output from the renewable power production facility is subject to meteorologically-induced variations, and meteorological forecast's have an inherent range of error. Because the present invention addresses the risks of failing to reliably deliver power as scheduled or predicted at predetermined production levels, renewable power production facilities may find much more significant penetration in the power generation and delivery market.

A feature of this invention is that it includes a system for trading electrical power produced from renewable energy power production facilities as premier power with an enhanced commercial value due to the power from the renewable facility being as fungible as other sources of power produced by fossil fuel power plants, hydroelectric plants, nuclear plants and the like. By minimizing financial and contractual risk in producing and marketing power from renewable power generation systems, the invention complements the inventive system and method of U.S. patent application Ser. No. 09/749,999, cited above, which includes at least the following features:

mechanisms, including sensor arrays, for forecasting an electric power output from at least one renewable energy power production facility for delivery at a predetermined future;

mechanisms for enabling a bidding exchange process to be used for selling "premier" power at a predetermined future time;

mechanisms for selling units of premier power for delivery at the predetermined future time;

mechanisms to assure transmission on the power grid, in case of limited transmission capacity, e.g., due available capacity, including restrictions due to faulty lines etc. in the power grid; and mechanisms for managing investment portfolio of premier power units.

The present invention adds at least the following additional elements:

mechanisms and processes for estimating an uncertainty as input to a portfolio to handle the risk, by an insurance-like pool;

mechanisms and methods for managing a risk portfolio associated with the system; and computer and computer program products for handling of trade with meteorological predictions.

As a consequence of having recognized the need to add statistical certainty to stochastic-dependent commodities, the present inventors have determined that the business impact of improved wind power production prediction capability will be a driver for at least the following developments:

development of meteorological forecasting techniques, development of sensor systems aimed at short time-scale monitoring, new investor relations in meteorological forecasting systems, new investor relations in power production systems, establishment of portfolios of power production predictions, establishment of portfolios of power production buy and sell options, establishment of portfolios of power transmission options, development of software and communications systems for ganged operation of power production units, increased penetration of renewable energy in power production systems, and establishment of new stakeholder relations in renewable energy production.

U.S. patent application Ser. No. 09/749,999 deals with matters that are associated to various stakeholders in businesses surrounding power production, like electrical power producers, electrical power grid companies, meteorological institutes, electrical power equipment manufacturers, energy exchange operators, and the like. There is, however, a non-negligible risk associated with the steps of translating meteorological forecasting to actual fluctuations in electrical power produced from renewable power plant facilities and applied to the (trans)national power grids. The invention of virtual energy storage and the xM and its prime mover option, discussed in U.S. patent application Ser. No. 09/749,999 takes significant steps to reducing this risk. The present invention further suppresses the risk. It does so by providing a system and method for providing a risk assessment of the consequences associated with utilization of weather forecasts and statistical methods in U.S. patent application Ser. No. 09/749,999 for predicting power outputs from renewable power plant facilities. The consequences of an unsuccessful forecast in such systems however, is further addressed by the present invention, which enables new business solutions and new vistas.

Conventional systems like CARE and EU Joule III focus on operating problems of power production, transmission and consumption systems; the present invention deals instead with the financial aspects and the energy exchange and profitability of power production prediction systems. Specifically systems with a significant penetration of wind power production.

The present invention employs a computer-based system, method and computer program product for receiving both forecast data and combining that data with power production capacities of various renewable power generation sources. In a preferred embodiment the renewable facility is a wind turbine power production facility, although the invention is applicable for other types of renewable power sources, as well as other types of systems and methods (like those discussed above) that must deal with imperfect meteorological forecasts. The system and method according to the present invention includes a mechanism for combining the forecast data, as well as statistical indications regarding a range of variability to be expected from the forecast, and combining the same with the expected power output capacities of the renewable facility. This variability then may be used to estimate a range of variability, which may be expressed in a probability density function, pdf, to assess a likelihood that a specific quantity of power will be delivered at a given time in the future. As a general matter, the more forward looking the forecast, the greater the variance in the prediction, thus the greater the spread of the pdf. Thus, it follows that estimates may be made with various confidence levels, regarding the likelihood of being able to deliver a predetermined amount of power at a predetermined future time. This data may either be marketed to various market actors (often investors) in the power generation and delivery business, but also may be provided as an investment instrument having its own market value.

When combined with the virtual energy storage (VES) option as discussed in U.S. patent application Ser. No. 09/749,999, risks associated with not delivering predetermined amounts of power, as contractually obligated, may be offset by relying on the VES to deliver any shortfalls and power that cannot be provided by the renewable facility. Thus, by quantifying the risk of shortfall or surplus at different times before the actual deliver, enables market participants to develop informed-strategies for purchasing options for back-up power, or selling excess power.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 17 is a chart showing factors used in calculating hydro risks in options trading and virtual energy storage operations;

DETAILED DESCRIPTION OF THE INVENTION

Figure 1:
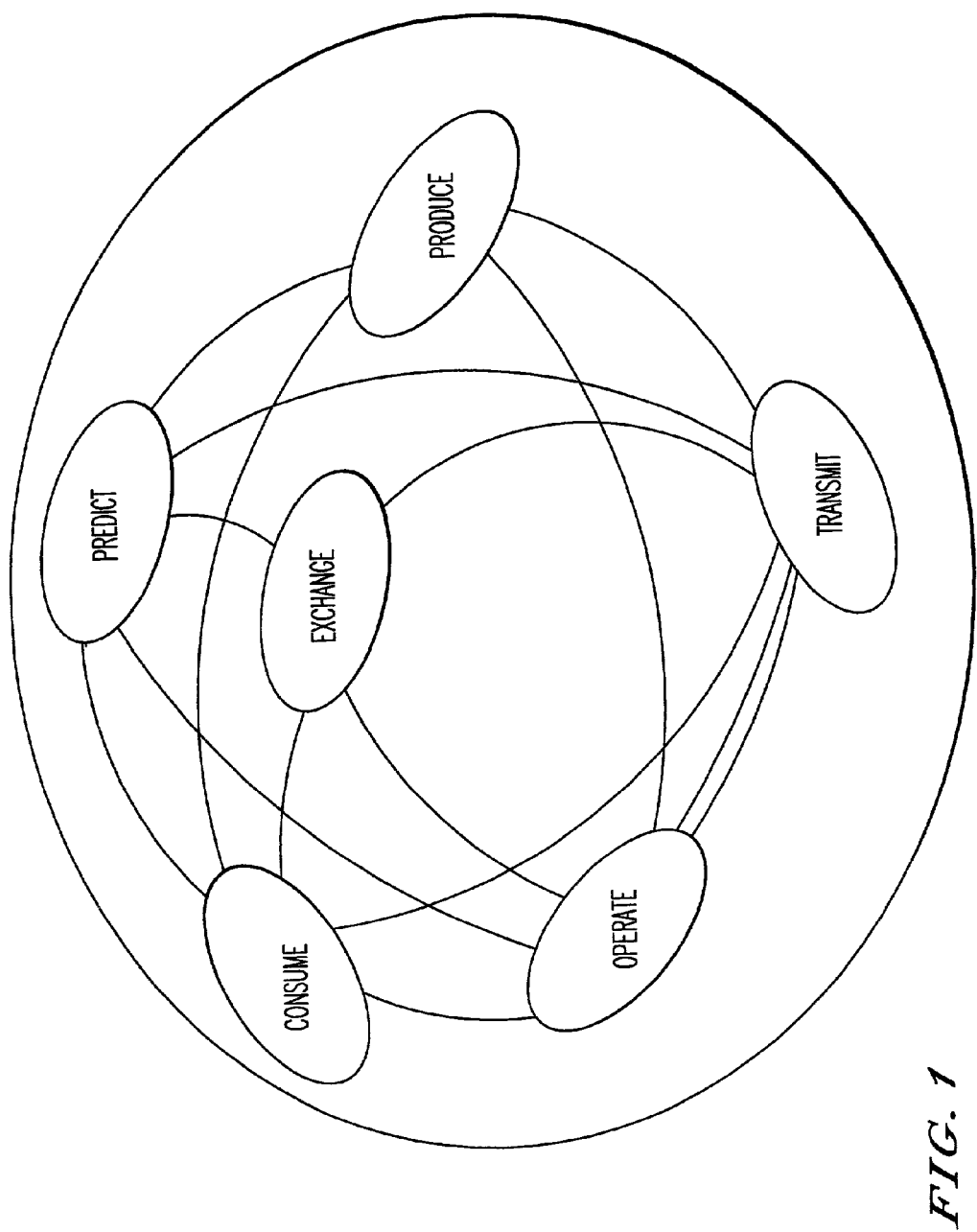
FIG. 1 is an activity diagram, showing respected interactions between different entities involved in producing, trading, distributing and consuming power produced from various power production facilities.

Referring now to the drawings, wherein like reference numerals refer to corresponding structures in the several views, FIG. 1 is a diagram that shows activities of different actors in power production, power transmission and consumption. Actors involved in the power production—transmission—consumption system include investors in facilities, investors in the energy exchange, facility operators, grid operators, power production prediction actors, load prediction actors, coordination consumers, and manufacturers of facilities. Viewing the deregulated energy market as a network of activities, the activities needed on the market may be seen in FIG. 1. FIG. 1 emphasizes the mutual dependency between all actors. These dependencies are valuable for a prosperous trade of fluctuating renewable power production. The activities are linked by contracts (or more generally agreements) regulating selling and buying power, building production units, trades of financial instruments, etc. A key issue as presently recognized to a successful market for wind power, or other renewable power source, is production forecasts. Another key issue to a successful market is communication between actors. The present inventors recognized that the contractual and financial instruments themselves, when based on reliable information about present and future power production capabilities, is one component of effective communication between actors. Moreover, the contractual and financial instruments themselves are an instantiation of agreements (sometimes purely financial and other times a hybrid of financial and delivery) between parties, where such agreements, when plentiful enough (according to the law of large numbers) have a stabilizing effect on the power production market (for example).

Since the financial risk of an erroneous power production prediction is large, the incentive for the market actors to trade with a fluctuating renewable power production depends on the accuracy of the predictions of the production. The uncertainty of the prediction emerges as a key parameter influencing the market price of future power production. The uncertainty also influences the monetary value of options to buy, sell and to trade with this production. The present invention helps to assuage concerns by actors in the renewable market by creating an insurance-like situation for the actors. The market actors are linked to one another in a loop of activities such as prediction/production/backup/storage/deliver/consume/trade/prediction wherein each investor is insured by commitments signed by the actors. The risk handling is taken care of jointly by this insurance-like pool of actors. Actors involved in the market trade financial instruments such as production predictions, back-up power delivery contracts, and transmission rights. The mismatch between the risk distribution and the capability to bear risks in the above-mentioned group of stakeholders is balanced. A win-win-relation is formed for all stakeholders by establishing system, mechanism, methods, business rights and proprietary rights, as well as computer program products according to the present invention.

With the significant impact of power prediction errors on markets with high wind power penetration, the role of the meteorological parties inherently contains risk. The incentive for meteorological parties to engage in a power prediction (or other meteorological prediction dependent activity) increases if the chain of activities and business links are formulated such that the financial risk connected to prediction errors is reduced, as is the case with the present invention. In the present invention, power production predictions may be marketed as an asset with a monetary value. Similar market approaches may take place in other chains of activities in other businesses areas, such as other renewable energy production sales, e.g. photovoltaic-based energy production and wave energy-based production. The prediction themselves form a portfolio that is traded on the market with the monetary values set by the prediction quality, the bid process, the situation, the demand, and the availability of production, as well as by the impact of lost power production.

The market place for the power production predictions may be closely linked to the energy market place and the predictions traded by similar methods. Various forecast periods would naturally have different market values. A fruitful business between owners of hydro plants and wind energy producers may for example be formed wherein power production prediction is combined with hydro plant storage capacity and wind farm peak power capability. The present invention allows these power producers to join forces and market wind power in a new approach something that the industry recognized is lacking, as explained in Lutz and Welter (pp 508-511, 1999 European Wind Energy Conference). The present invention allows trading of power products in a liberalized energy market. The invention further describes a scheme for mutual risk handling for the parties involved.

The predictability of a meteorological variable depends strongly on type of variable and time frame (i.e. forecast length). Together with the variable and time frame issue follows a need for an analysis of the impact of a given prediction error. Variables that are of particular interest to renewable power production facilities are: wind speed (magnitude and vertical variation, gusts), wind direction (vertical variation), cloudiness (cloud cover, type of cloud, cloud layer depth, height of layer, radiation absorption and emission), rain, hail or snowfall (rate, particle size, coverage), lightning strokes, (frequency, probability of hit, strength).

Conventional weather dependent operations have been supported by meteorological predictions (U.S. Pat. Nos. 5,521,813, and 5,461,699) as has traditional power load predictions based on degree-days (U.S. Pat. No. 6,105,000). A system for valuating weather-based financial instruments was described in WO patent 0021015. A tool for forecasting spot price of electric power including information from weather forecasts was described in U.S. Pat. No. 5,974,403. A system for weather adapted, business performance forecasting was described in WO patent 9726613. A neural network forecasting system was described in U.S. Pat. No. 5,461,699. (US05140523, JP06347563, JP06276681). A system for weather based planning of future activities was described in WO patent 068854A2. JP07043001, JP04365101, JP56094149, JP56094148, US006098893, US046326931 are other patents somehow related to weather. A method for rating of geographical areas with respect to meteorological conditions was described in U.S. Pat. No. 5,839,113. In these conventional applications, meteorology has played a part of providing predictions and analysis of geophysical data. Users of the information provided are at risk and in need of judging the reliability of the data. The meteorological partner in these doings have not been able to guarantee the predictions since the stochastic nature due to the strong non-linearity of the geophysical systems inevitably leads to a certain probability of error in predictions. The present invention allows the meteorological partner to take a larger share of the business.

Figure 2:
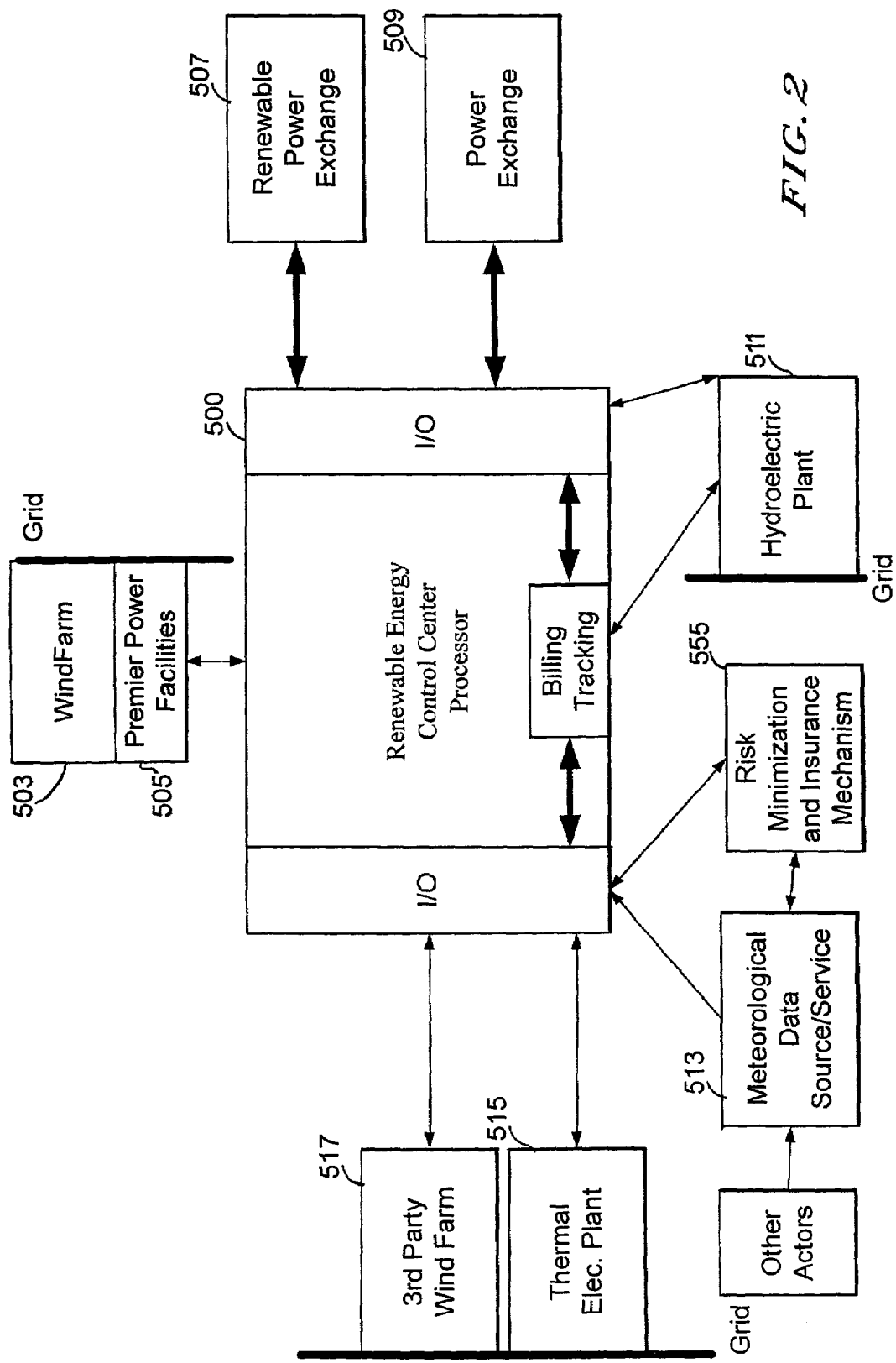
FIG. 2 is a block diagram of a system that may be employed according to the present invention, that includes a risk minimization and insurance mechanism according to the present invention.
Figure 5:
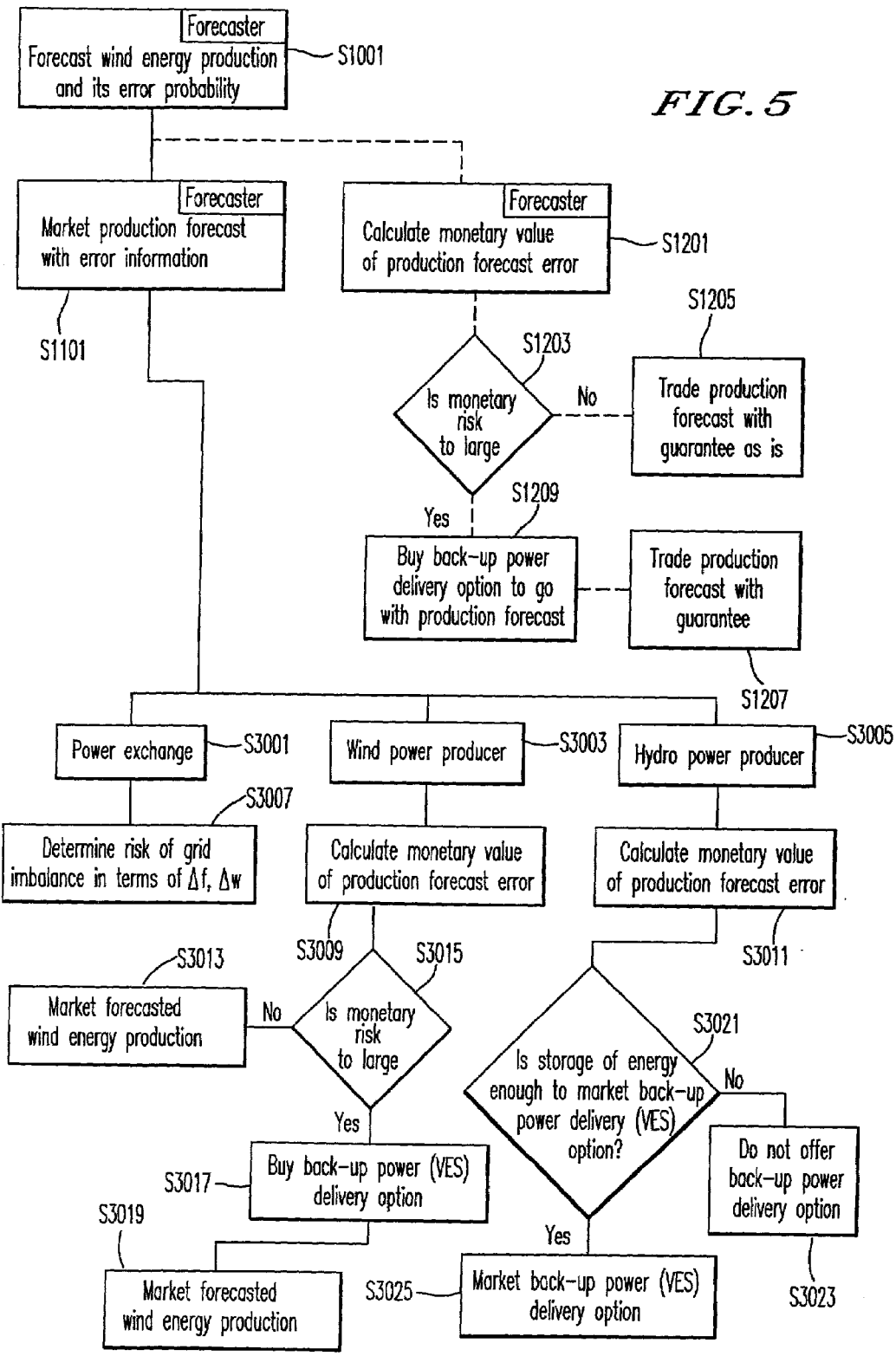
FIG. 5 is a flow chart of a process flow according to the present invention regarding activities leading from an energy production forecast and trading of the energy, as well as possible back-up delivery options according to the present invention.

Turning to the discussion of FIG. 2, FIG. 2 is much like FIG. 5 in U.S. patent application Ser. No. 09/749,999 A difference however is the inclusion of a risk minimization and insurance mechanism 555, which will be discussed in detail following a detailed description of the other elements of FIG. 2.

A renewable energy control center processor 500 is shown, and includes input/output (I/O) interfaces that connect to communication facilities at a renewable power exchange 507, the power exchange 509 (such as Nord Pool), alternative renewable energy sources such as a hydroelectric plant 511, meteorological data source information as well as service information 513, thermoelectric plants 515 (or other type of electrical generation power plants), third party wind farms 517 as well as a wind farm (which may be a single wind turbine) 503, which includes premier power facilities 505, shown in a form of a co-active converter embodiment. Each of these other facilities include communication and control equipment that allow for exchange of information with other parties, and enable control of the respective facilities based on the information exchanged. While the terminology "wind farm" is used herein as an illustrative term, it should be clear that the invention applies to all types of activity that has a production or service that is affected by short-term stochastic variations. Thus, the term "wind farm" as used herein, should be construed as a generic term for renewable power production facility that has a short-term stochastic production property.

The control center processor 500 may also be included in the premier power facilities 505, in an alternative embodiment. Or, alternatively, the processor can be a part of a power exchange's trading and software system. The control center processor 500 cooperates with the premier power facilities 505 and hydroelectric plant 511 (or alternatively thermoelectric plant 515 and/or third party wind farm 517) so as to make the electrical output from wind farm 503 a reliable source of electric power. The premier power facilities 505, in cooperation with the process 500 includes a capability to ensure that the form of electric power (stability of output waveform, ability to produce or sink reactive power, and provide short circuit power), when coupled with a "virtual energy storage" (VES) facility (hydroelectric plant 511 in this embodiment, although other plants may be used as discussed herein also as virtual energy storage sources as well, which uses others sources of energy reserves to produce electric power, such as heat storage systems, e.g. district heating systems or boiler feedwater systems) is producible in fungible energy units. More particularly, while the premier power facilities 505 places the output waveform from the wind farm 503 in a suitable form for connection to the power grid, it also includes an adequate short circuit current capability which is used when there is a fault in the grid and significant amount of current is required to trip circuit breakers in this fault mode of operation. The premier power facilities 505 also had an ability to provide reactive power to the grid at a position that is near the wind farm 503. The short circuit current capability and reactive power sinking capability being ensured by the premier power facilities 505, which contains a coactive converter. As recognized by the present inventors, the longer-term output power from the wind farm 503 may be made sufficiently predictable and reliable, in a business setting, such that units of the electrical power produced by the wind farm may be "guaranteed" by contractual relationships or other agreements with hydroelectric plant 511, in this example. These agreements are helpful in the event of a wind lull for the wind farm 503, where a control message is dispatched to the hydroelectric plant 511 to provide a compensating amount of electric power to offset the short fall from the wind farm. Using the cooperative arrangement the energy output obligation from the wind farm is achieved by asking the hydroelectric plant 511 to output sufficient power to compensate for the temporary short fall from the wind farm.

While the above discussion illustrates the case where the wind farm requires supplemental power to be produced at the virtual energy storage facility, the reciprocal relationship is equally important. When the wind farm produces more power than planned, the surplus power may be saved in the form of virtual energy at the virtual energy storage facility. Once stored, the stored energy is completely fungible and may be withdrawn upon request, or possibly even sold to a third party, for use under the control of that third party. Moreover, by having preserved a predetermined amount of energy in the virtual energy storage facility, the stored energy is available as a resource to be converted to electric power at the demand of the wind farm operator, or simply preserved for a longer period of time or sold to a third party. In this way, the virtual energy storage facility offers the equivalent of a bank account, where the "currency" is chemical or potential or kinetic (rotational) energy.

As examples of business activities dependent on the present invention's meteorological information, one can move an energy asset in a power portfolio physically from a distant set of virtual energy storage, VES (likely based on a hydro power plant, potential energy), to another set of VES inside, or close to, those regional power grids where transmission limitations often appear. Such a move is normally done outside the power exchange. These activities can be done more or less for so-called power scheduling and/or for using them as distributed spinning reserve units (kinetic energy). The system and method for risk-minimization and mutual insurance relations as described herein are thereby combined with the VES systems and methods as described in U.S. patent application Ser. No. 09/749,999, and other U.S. Patent Application cited above. The latter set of VES above might, for physical reasons, be more likely embodied as electrochemical accumulators (batteries, chemical energy), as compressed air energy storage (CAES, potential energy), as flywheel (kinetic energy), as hydrogen storage units (chemical energy, e.g., with hydrolysis and fuel cells), heat storage systems such as district heating systems or boiler feedwater systems, or the like, when there is a lack of (non-pumped) hydro power plants (potential energy) in the region. These arrangements and procedures reduce the risk associated with all financial instruments, contractual obligations, etc. on their physical delivery as units of electrical energy to a specified regional grid area from distant, fungible renewable power plant facilities. Thus, this generally simplifies system operation of the (trans-)national power grids, e.g., incorporating electrical power business activities dependent on meteorological information like the prediction methods and mechanisms described herein.

As will be appreciated throughout this discussion, by having recognized that the availability of rapid and real time communication between the control center processor and the hydroelectric plant 511, the water reserve held at the hydroelectric plant, may be used as a virtual energy storage facility for the wind farm 503. More particularly, in the event of over capacity production by the wind farm 503, the premier power facilities 505 communicates this condition to the control center processor 500, which sends a message to the hydroelectric plant 511, requesting that the hydroelectric plant 511 produce a corresponding lesser amount of electric power during this period of overproduction. The total output power from both the wind farm 503 and the hydroelectric plant 511 is thus held to be consistent with the aggregate delivery requirement for both the hydroelectric plant 511 and wind farm 503. Moreover, at any given time, the wind farm 503 and the hydroelectric plant have certain contractual obligations to produce predetermined amounts of power. This predetermined amount of power in the aggregate will equal a certain level of power. However, recognizing that for maximizing power output, the wind farm 503 does not have precise control over the amount of power it produces at any given instant in time, by communicating from the wind farm 503 to the hydroelectric plant the amount of overproduction, the hydroelectric plant 511 can adjust its output level so as to compensate for the surplus. Likewise, for a shortfall, the wind farm 503 may communicate to the hydroelectric plant the amount of extra power that the hydroelectric plant will need to generate in order to compensate for the shortfall by the wind farm 503. The hydroelectric plant 511 will thus be able to save a predetermined amount of its water reserve for use or sale (or transferred or traded) at a later time. This amount of water (or electrical equivalent) is in a bilateral options market held on account for the wind farm 503 for use at a later time, and in the case of a PX options market it will be available for later trading (e.g., in a bilateral options market or a PX options markets, to be described below). Shown as the "Grid" in FIG. 2, any adjustment made in output power from the wind farm 503 and the hydroelectric plant 511 is communicated to a system operator so that the system operator may also dispatch commands regarding adjustments that may need to be made to reactive power control at the different facilities so as to balance the reactive power loads placed on the grid. If there is a large electric distance between the wind power mills and the virtual energy storage facility, these facilities are able to provide voltage support at least at two sites, independent of one another. In the preferred embodiment, the wind power park is able to provide the voltage support via the xM (contained in the Power Facilities and described in more detail in U.S. application Ser. No. 09/900,874 cited above) at the wind power park site, and at the hydroelectric plant voltage support is provided by synchronous generators, independent of whether the wind power turbines actually produced active power at the time of delivery. Thus, the present embodiment is able to provide adequate voltage control, which is able to be kept to within a predetermined voltage limit at the point of common connection.

The connection between the premier power facilities 505, the renewable energy control center processor 500 and the hydroelectric plant 511 (as well as the other communication links shown in FIG. 2) may be made by way of an Internet connection, which may use a combination of land-lines, submarine cables, or wireless links such as point to point radio frequency links (e.g., microwave, satellite, MMDS or the like), or a combination thereof. Proprietary or leased wired or wireless links may be used as a substitute or to complement the Internet connection or a connection built on the same transmission towers or in the same cable trenches (channels) as used by the power grid to connect the participating production units in the grid. The latter connection is preferably a fiber optic connection, such as a part of a communications segment of the grid itself, and/or a broadband network, which could be a part of a national fiber optics communication infrastructure, and be leased (at least in parts) to a third party. In this case, the communications link between the renewable energy control center processor 500 and the hydroelectric plant 511 includes at least a portion of an Internet connection (the detailed features of which are found in the textbook by Preston Gralla, "How The Internet Works", Que Corporation, ISBN: 0-7897-2132-5, August 1999, the entire contents of which being incorporated herein by reference). The control center processor 500 includes a URL that is available for access by the respective wind farm operators and other electric power plant operators so that a Web based graphical interface (e.g., Web browser, such as "EXPLORER" offered by MICROSOFT, and as described in "How Computers Work", by Ron White, Que Corporation, ISBN: 0-7897-2112-0, pps. 360-365, September 1999, the entire contents of this book, which is relevant to the hardware and software employed in the processor 500 as well as the risk minimization and insurance mechanism 555, is incorporated herein by reference) is presented to the operators of the different plants. The communication link is a secure link, provided with encryption such as by way of a virtual private network (VPN). Alternatively, instead of a World Wide Web interface using the Internet, digital communication links including proprietary links may also be used for interfacing the control processors at the hydroelectric plant 511 and the premier power facilities 505 by way of the control center processor 500 for example. The operations interface can thus monitor and control a VES options contractual operation of the wind farm 503 and the hydroelectric plant 511 for example. Thus, a change in power production (e.g., above or below planned amounts) at the wind farm 503, is immediately (preferably within a second, although in some cases with a lag time of a 10 seconds, or in some rare cases a minute or more) compensated for at the hydroelectric plant 511. A principal factor in determining the actual delay time is the response time of the hydroelectric plant 511 to a command from the wind farm 503 requesting that the gates at the hydroelectric plant 511 be opened or closed by some predetermined amount. When the response time of the hydroelectric plant 511 is routinely more than a few seconds, the processor 500 may use the data from the meteorological data source/service to predict the amount of surplus/shortfall that will need to be addressed at some predetermined period of time in the future (e.g., 10 seconds or more). In this way, the wind farm 503 (or alternatively the hydroelectric plant 511 itself) may dispatch an "anticipatory" control command to the hydroelectric plant 511, causing the hydroelectric plant 511 to begin to make the necessary adjustments for increasing/decreasing the power production based on the forecasted surplus/shortfall in power production from the wind farm 503 as a result of predicted wind speed increase or decrease.

Risk Management and Trading Processes for Option Markets

In concert with previously described embodiments, this invention includes new processes for managing risk relating to renewable power generation. This includes Wind farms ("WF") and Hydro producers ("Hydro"), as well as the corresponding trading and balancing task of the power exchange (PX).

A PX market is a market with preferably standardized products for trading, but also more tailor-made products when the need arises. Sellers and buyers meet anonymously (e.g., via a computer-based bid/sell system) or in the open to bid-on and sell product, such as units of power (e.g., a unit of power produced from a renewable energy source). A bilateral market is a market where buyers and sellers meet in the open (i.e., where identities are known, or could be known) through any media, telephone, internet, or other communications tools. A bilateral market, in which a product may be a power delivery contract between two parties, can support trading where the participants agree over a PX interface.

Risk management procedures, according to the present invention, for WF and Hydro can be handled in at least two different ways, but still fulfill the same needs and comply with the ability to make "green" energy an equally fungible source of power as that generated by other power production facilities. The production uncertainty from the WFs could either be handled through a standardized options market, or it could be handled through a system of bilateral options contracts between pinpointed WFs and Hydros.

A general PX options market embodiment contains more standardized risk management tools and leave more of the responsibility for handling the production uncertainty risks with the WFs. On the other hand, liquidity and turnover on that kind of market is better, and the costs for management of uncertainty would probably be lower.

A general bilateral option market embodiment contains more or less customized production uncertainty solutions. In this kind of market, the specific WFs leave all or most part of their risks to a specific Hydro or group of Hydros. This kind of market has insurance-like features, and the lack of standardization will thus lessen market liquidity.

The two general embodiments are described below:

In the general PX options market embodiment (FIG. 18), the WFs have the full responsibility of ensuring that the variation in power production is compensated for by power produced from a Hydro. Variation in the WFs' production may be covered by buying both call and put options on power for every specific hour. The options are standardized, which enables a high liquidity in the options market, and thus lowers the cost of risk management for WFs.

Put and call options are issued by the Hydros for one specific time period, and the strike price is preferably the spot price (or could be another price) on the PX for that actual hour. The put option gives the WF the right to sell additional production that exceeds the amount bid into the spot market, and the call option gives the WF the right to buy power in order to meet its obligations in the spot market. The options cover maximally one predetermined energy unit, which makes it easy for the parties to assign a price based on the perceived value of the energy unit.

Since the options cover a predetermined amount of energy, it is up to the WF to calculate and buy enough quantities of options to cover the uncertainty in power production. The WF operators may opt to forego the expense of buying the option, if the WFs are equipped with a premier power facility that has the ability to produce its own power from another energy source (such as compressed gas, heat storage systems such as district heating systems or boiler feedwater systems, and/or fossil fuel, which may be used in a coactive converter if necessary). Consequently, the respective WF operators can decide upon a confidence level for the ability to comply with the production bids placed at the spot market. For the Hydros, it is easy to value and price the obligation of the option, since the options have a maximum energy amount coverage.

Figure 18:
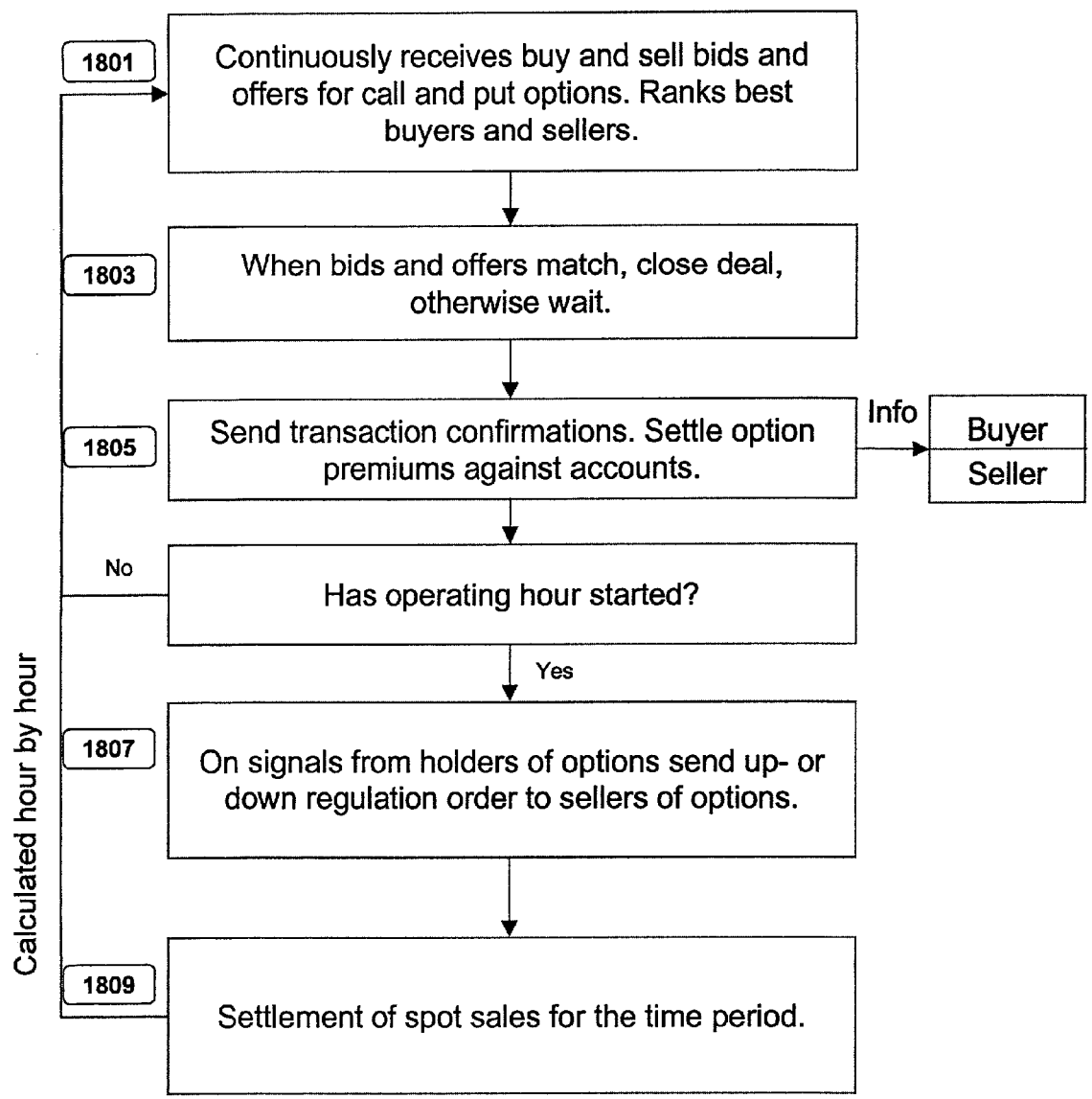
FIG. 18 is a chart showing operations of a power exchange options market.

Specifically, the PX options market continuously receives buy and sell bids and offers for call and put options (as shown in step 1801 of FIG. 18). The market also ranks best buyers and sellers against various criteria (e.g., quantity of power units needed, location where power is needed, reliability of delivery, reactive power needs, coordination mechanisms, etc.). When bids and offers match (1803), a deal is closed, and both parties are provided with a notification via an update on the web page, or other computer-based message for computer-based bid/sell trading. Upon closing the deal, transaction confirmations are sent to buyers and sellers (1805) and option premiums are settled against accounts. Electronic accounts are preferable, although conventional paper-based notifications and updates are possible as well. A determination is made whether the option hour has started or not. If yes, a send-up or send-down regulation order is sent to sellers of options from holders of options (1807). If no, participants continue to monitor the market (1801). This leads to settlement of spot sales for the given time period (1809). Data about the market is calculated hourly.

Figure 19:
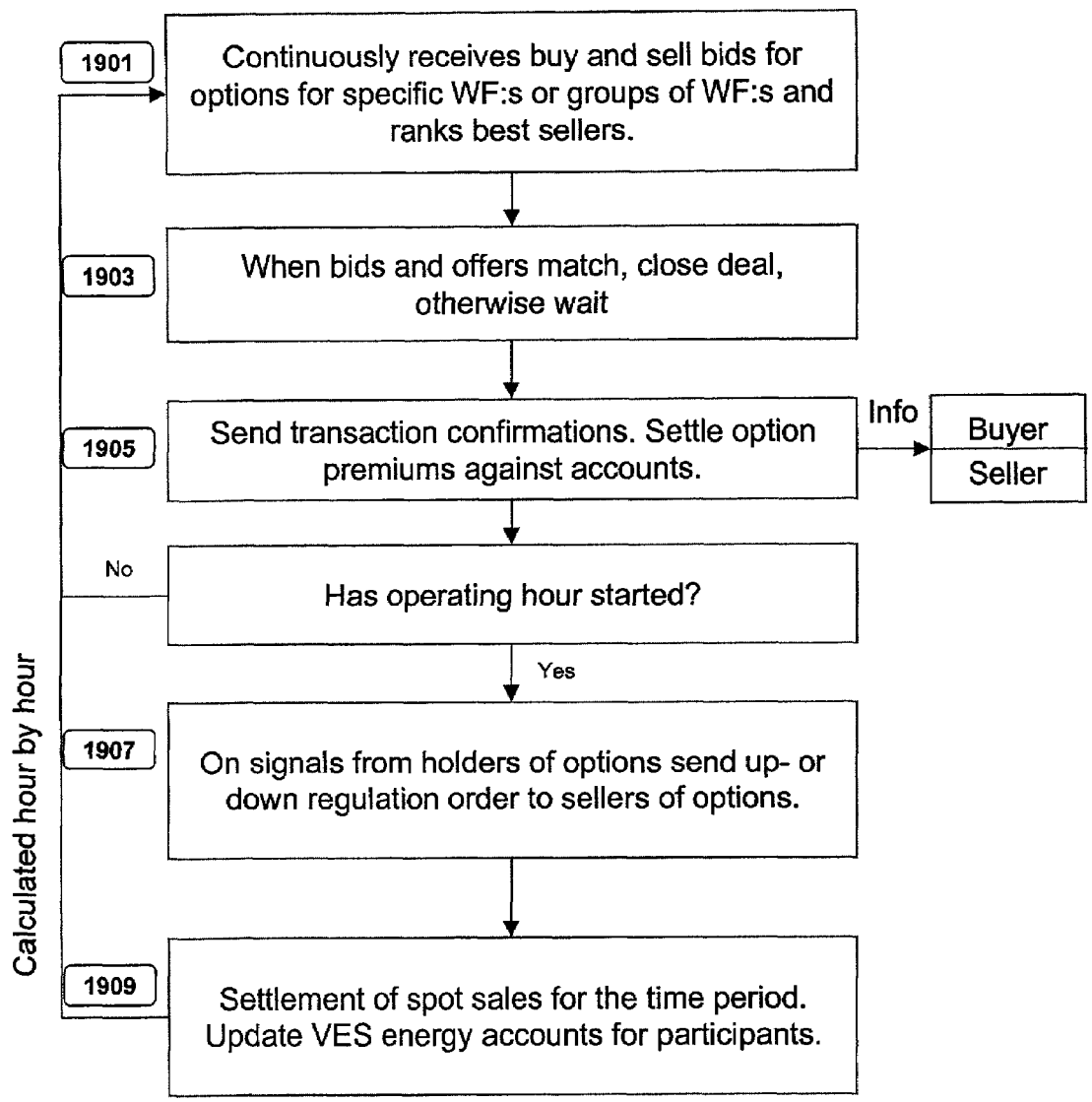
FIG. 19 is a chart showing operations of a power exchange bilateral options market.

In the general bilateral options market embodiment (FIG. 19), a WF buys just one option from a Hydro. The option gives the buyer the right to buy or sell enough power to meet the obligations for a specific WF or set of WFs. The option is thus customized to fulfill the needs of a specific WF or set of WFs.

This implies that valuing and pricing of the option has to be done with different sets of data.

The general bilateral options market embodiment has insurance-like features in some cases, since it guarantees the holder of it to meet its obligations, and thus covers all the risk. The fact that one option covers the volume risk for a WF, means that it will be priced according to the uncertainty in wind power production for the time period. The production uncertainty is different for every WF, which means that a separate valuation and pricing must be done for every option, which will effect market liquidity negatively.

Specifically, the bilateral options market continuously receives buy and sell bids for options for specific WFs or groups of WFs (1901). The market also ranks the WFs against various criteria. When bids and offers match (1903), a deal is closed. Upon closing the deal, transaction confirmations are sent to buyers and sellers (1905) and option premiums are settled against accounts, in much the same way as discussed above with regard to FIG. 18. A determination is made whether the option hour has started or not. If yes, a send-up or send-down regulation order is sent to sellers of options from holders of options (1907). If no, participants continue to monitor the market (1901). This leads to settlement of spot sales for the given time period (1909). Data about the market is calculated hourly.

Figure 20:
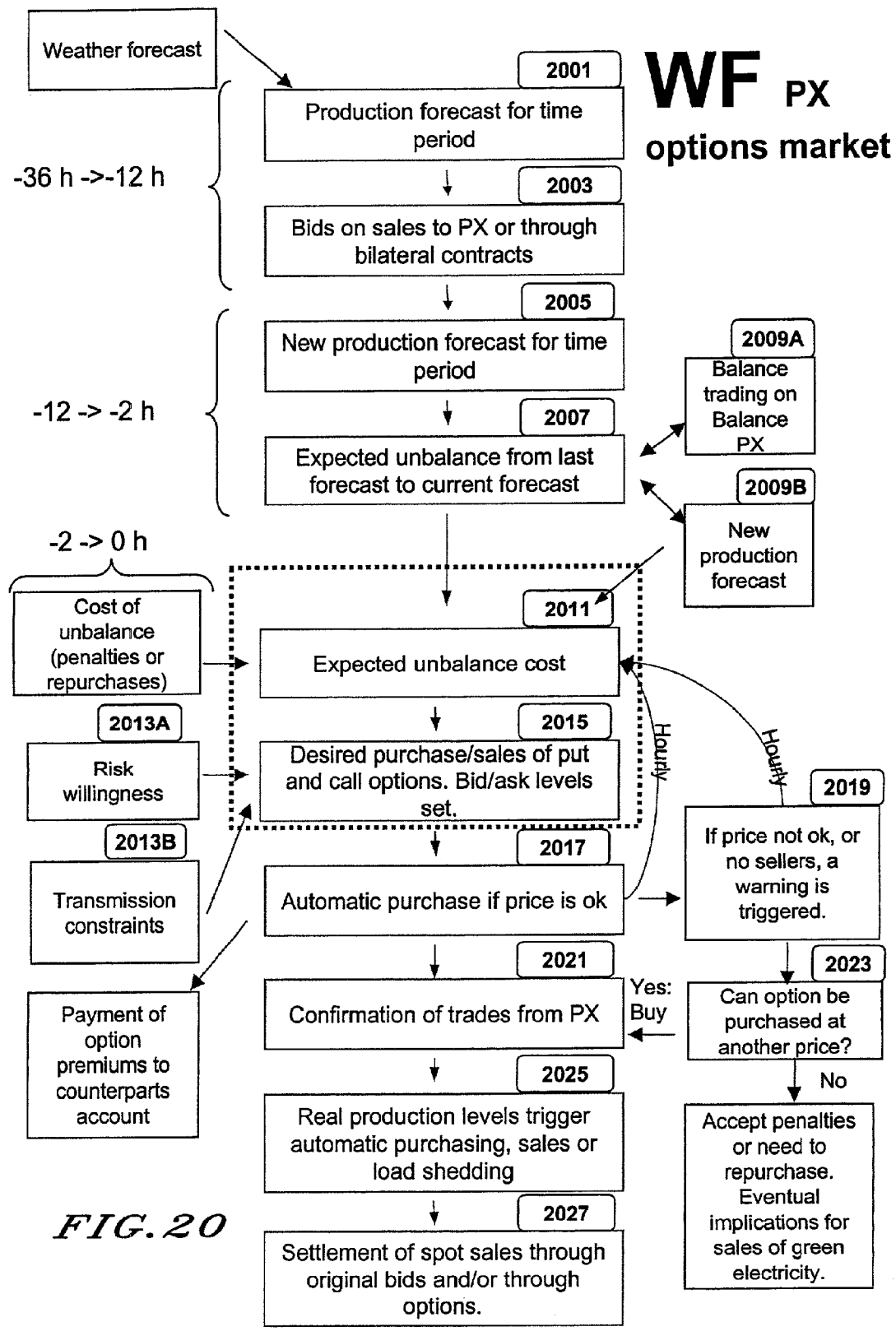
FIG. 20 is a chart showing a wind farm perspective in a power exchange options market operations.

A WF-PX options market embodiment of the present invention is shown in FIG. 20, and can be implemented on a computer network that enables communications between Power Exchange 509 (FIG. 2) and other parties, such as the risk minimization and insurance mechanism of processor 500, which is associated with windfarm 503. In the PX options market, the WFs make or acquire production forecasts according to the latest weather forecasts (2001). The production forecast includes at least the expected production volume for different probability levels.

At the time when bids are to be submitted on the spot market, the WF (actually the operator, or a software based process operating on behalf of the WF operator) bids its expected production for the time period (2003). The bid production volume would usually be the expected production. Alternatively, the bid production volume can be set to another level such as the volume (in discrete standard units) at with the WF is 90% certain of being able to meet the production. If the cost of call options differs from the costs of put options, the bid production volume on the spot market would differ from the expected production volume in order to minimize production uncertainty cost.

After the expected volume is bid on the spot market, new weather forecasts could change the expected production of the WF (2005). This leads to an expected unbalance (2007). If there exists a market for balancing power (such as Elbas on the Swedish and Finnish market), the WF can continuously trade itself into balance on the balance market (2009a and 2009b), until that market closes before the time period.

After the balance market has closed, or if there does not exist a balance market, new weather forecasts will lead to an expected unbalance that cannot be covered with existing financial instruments. Given the cost (expenses and/or fines) of unbalances determined by the ISO, such as penalty costs or repurchasing costs, an expected unbalance cost can be calculated for the WF for the time period (2011). Also given the probabilities of different production levels from the latest production forecast, the unbalance costs for different probability levels can be calculated.

The expected unbalance costs in combination with the risk willingness of the WF and possible transmission constraints, will determine how many options the WF would want to buy, and at what maximum price, in order to manage its production uncertainty risk.

Figure 16:
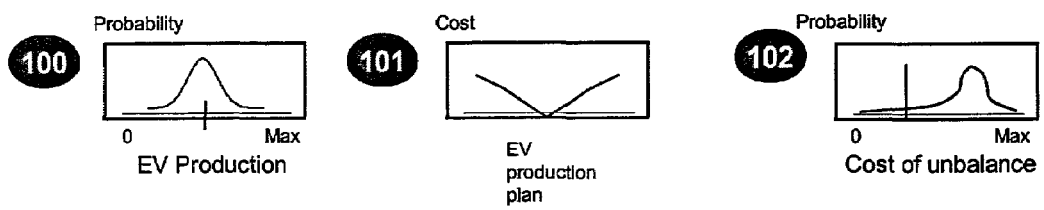
FIG. 16 is a chart showing factors used in calculating wind farm risks in options trading and virtual energy storage operations.

The risk willingness of the WF (2013a) defines how much risk the WF can accept. The risk willingness is a factor depending on the costs of not being able to fulfill the bid production levels on the spot exchange or in bilateral contracts, possible costs/lost revenues if the delivery of "green" energy cannot be fulfilled, but it also depends on the financial situation of the WF (i.e. the risk of financial distress). Further insights about penalties for production shortfalls are found in FIG. 16. Possible transmission constraints (2013b) will also affect the desired purchase/sales of options, since it will have an influence on the possibility of the WF to meet its obligations in all situations.

The amount of options and the highest acceptable price will then be calculated automatically (2015). The risk willingness will influence to what level of unbalance that options will be bought to cover the risks. A risk averse WF would probably buy options to cover the effects of all possible production levels, and a more risk seeking WP would probably not buy options that cover more than a certain degree of all possible production levels but not all. By keeping some of the risk, the total option costs can be lowered. It is therefore a balance between the cost of options that cover the very last part of the risk and the possible cost of production unbalance that could occur if not all of the possible production uncertainty is covered with options. This automatic process of determining the amount of options and the highest acceptable price for them, results in bidding information that is submitted to the PX options market.

The bidding information from (2015) is matched with the current asks for options for the time period on the PX options market (2017). If there are asks with acceptable prices, there will be an automatic deal. The trade is settled automatically, and the options premium is settled against the WFs and the Hyrdos respective PX account. A confirmation of the trade is sent out by the PX (2021).

If there are no acceptable asks, a warning signal is triggered to the WF (2019). The WF has to decide whether to raise its bid to reach a deal, or to wait for other possible asks at a later time (2023). If no deal is reached, the WF has to accept eventual penalties or costs associated with the production uncertainty.

During the production time period, any deviations from the forecasted wind power production will trigger an automatic signal to the PX (2025). If the WF has enough options to compensate for the fluctuation, the PX calculates what regulation that is required by every seller of options for that time period, and sends regulation signals to the Hydros.

After the production time period has passed, the PX settles the sales of on the spot market (2027). All participants get credits for the amount of energy they produced, regardless of any possessions of options.

Figure 21:
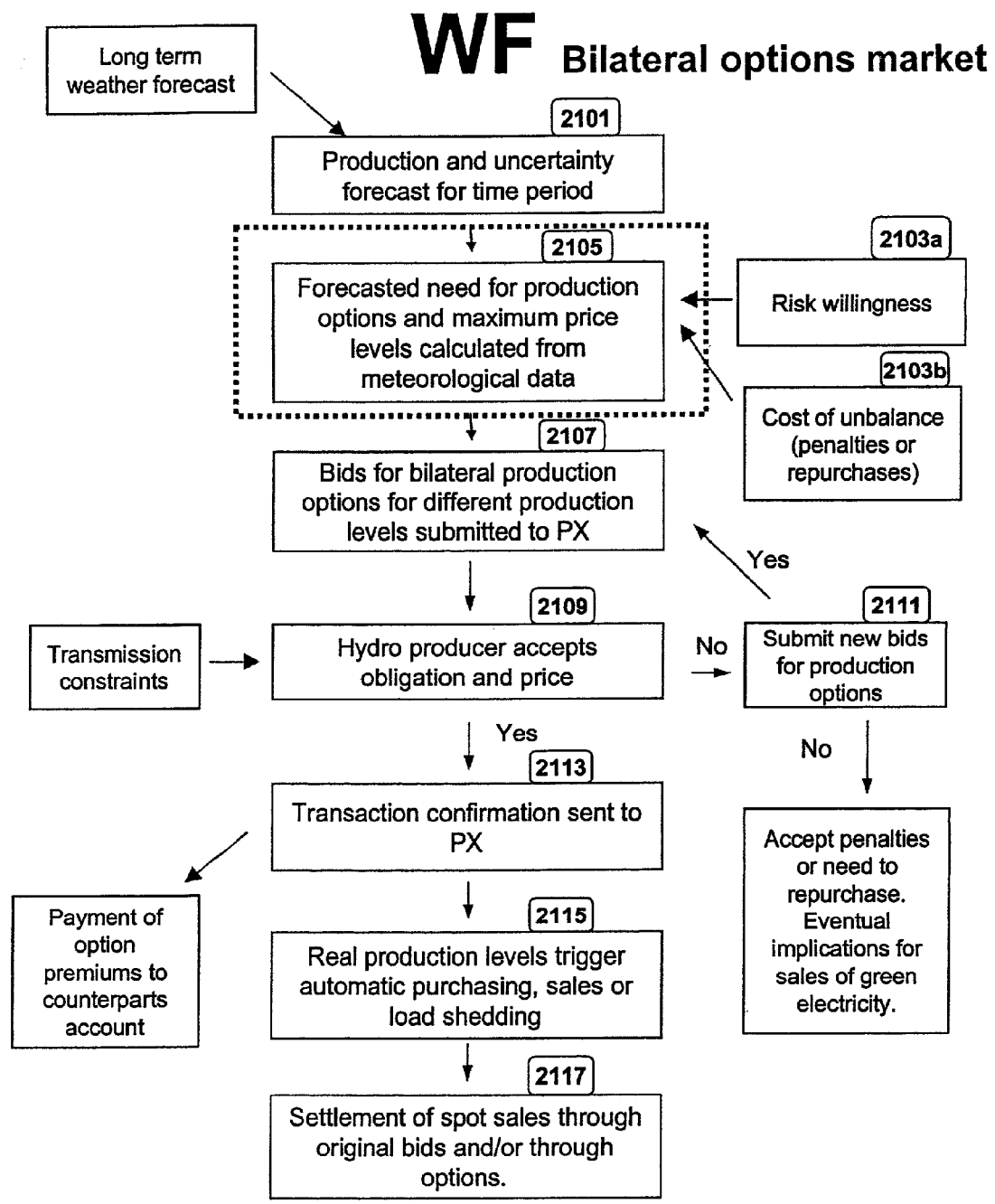
FIG. 21 is a chart showing a wind farm perspective in a power exchange bilateral options market operations.

A WF-Bilateral options market embodiment is shown in FIG. 21. In the Bilateral options market, the WFs makes or acquires production forecasts according to the latest weather forecasts (2101). The production forecast includes at least the expected production volume for different probability levels.

The risk willingness of the WF (2103a) defines how much risk the WF can accept. The risk willingness is a factor depending on the costs of not being able to fulfill the bid production levels on the spot exchange or in bilateral contracts, possible costs/lost revenues if the delivery of "green" energy cannot be fulfilled, but it also depends on the financial situation of the WF (i.e., the risk of financial distress). Further insights are found in FIG. 16 as described previously.

The costs of unbalances determined by the ISO, such as penalty costs or repurchasing costs (2103*b*), will also affect the WFs need for production uncertainty risk management.

The production forecast with uncertainty for the time period, together with the risk willingness and cost of unbalances for the WF, all affect the design of the required bilateral option. The required design of the option, and also the highest acceptable price, is calculated automatically by the WF (2105). Further insights are found in FIG. 16 as described previously.

The WF thereafter places bids for the bilateral option. This can be done either manually in direct contact with Hydros, or (preferably) on the electronic bilateral options market for that specific option (2107). The bid must contain information about the expected meteorological situation, the expected production for different probability level, and perhaps also information about the specific WF (production history etc.). The bid must also have a highest acceptable option price for the WF.

With all requests for power options on the PX, the Hydros can calculate the expected profitability of every bid. The possibility to accept a bid is also affected by possible transmission constraints in the grid, since it influences whether the hydro can meet its obligations in all situations. If any bids are placed on acceptable levels, the Hydro accepts the obligation and issues the bilateral option to the WF in question (2109).

If no bids are placed on an acceptable level, the Hydro can submit counterbids on a higher level to every WF of interest. The WF can then either try to submit a new bid on a higher level (2111), or it have to accept eventual penalties or costs associated with the production uncertainty.

If a Hydro accepts the bid, a transaction confirmation is sent to the parties (2113). The trade is settled automatically, and the options premium is settled against the WFs and the Hyrdos respective PX account.

During the production time period, any deviations (e.g., user settable such as 10% deviation, 20% deviation, etc.) from the forecasted wind power production will trigger an automatic signal. If the option was traded at the PX, the signal is transmitted to the PX (2115), and the PX forwards the regulation signal to the specific Hydro. If the bilateral option was bought directly from a Hydro, and thus not bought at the PX, the signal is transmitted directly to the issuing Hydro. Multiple triggers can be set, such that a first shortfall (e.g, 10%) is satisfied by a first bilateral option, and a second shortfall (e.g., above 20%) is satisfied by second bilateral option.

After the production time period has passed, the PX settles the sales on the spot market (2117). All participants get credits for the amount of energy they produced, regardless of any possessions of options.

Figure 22:
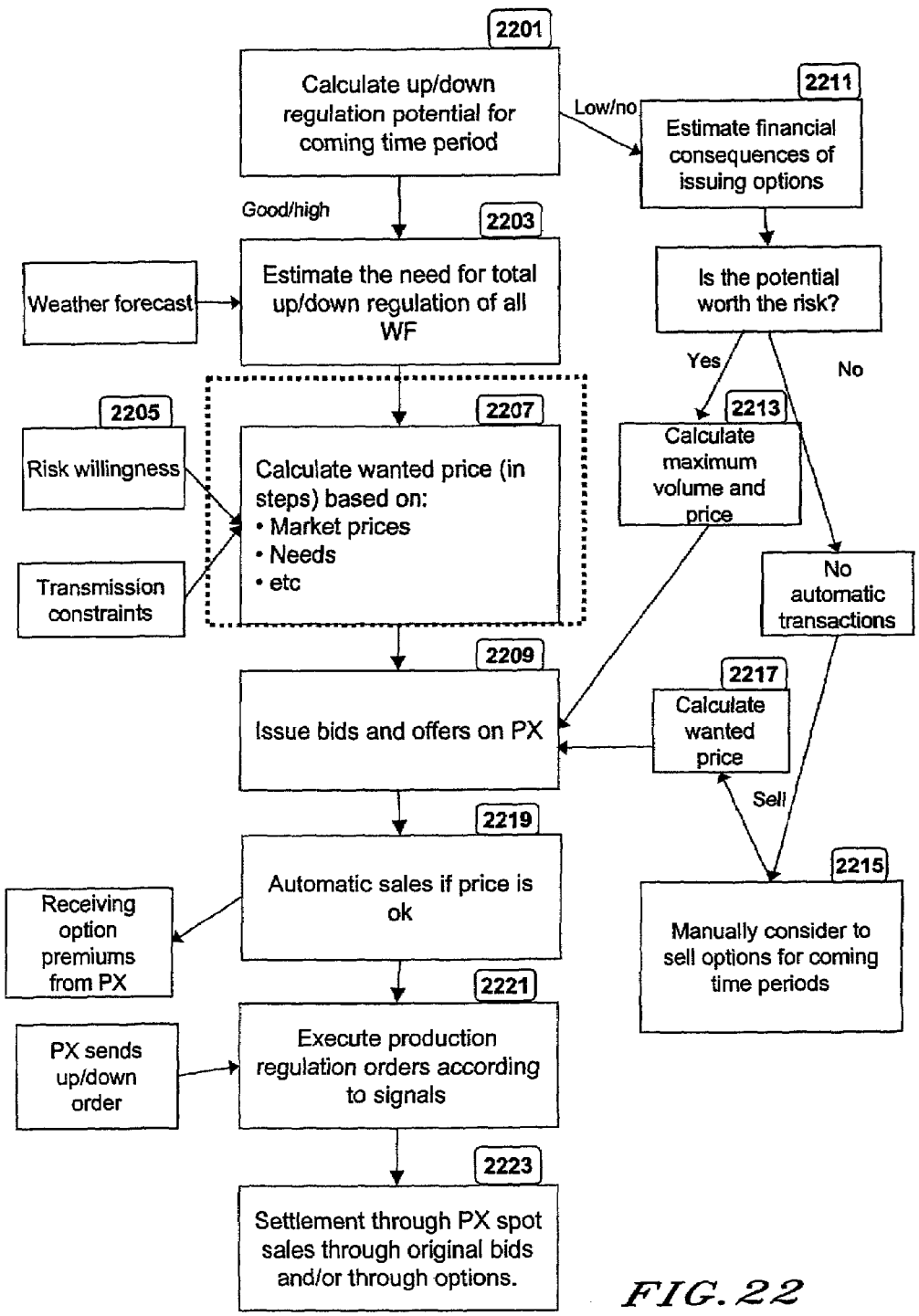
FIG. 22 is a chart showing a hydro perspective in a power exchange options market operations.

Hydro-PX options market embodiment is shown in FIG. 22. The Hydro continuously calculates its regulation potential for the coming time periods (2201). The regulation potential is influenced by the current reservoir level, the planned production level for the coming time periods compared to minimum/maximum production levels and the price level on the spot market compared to the price level on the futures market.

If the regulation potential is good, the present weather forecasts are used to calculate the forecasted need for total up/down regulation for all WFs in the market (2203). The total forecasted regulation need will determine the value of regulation potential, and thus set the price for regulation options.

The risk willingness of the Hydro (2205) depends on the willingness to accept financial risks and on the financial consequences of unplanned regulation. Further insights are found in FIG. 17 as described previously. A Hydro with good regulation potential would suffer less from unplanned regulation, and would thus be more willing to take on risks from issuing options.

The estimated total need for regulation, which in fact sets the price level for regulation options, together with the risk willingness of the specific Hydro, is input when the wanted price for issuing options is calculated (2207). In a situation with a strained transmission situation in the grid, possible transmission constraints also have to be taken into consideration since it will affect the possibilities to fulfil the obligations from the issued options. The wanted price for the regulation options are based on the market need for regulating power, the Hydro's ability to issue options, and on the market price for different time periods. These factors are taken into consideration in a valuation model, that could be run automatically. When the price for options are calculated, the options are issued automatically on the PX (2209).

If the regulation potential in the first box (2201) on the other hand would be low, the potential financial consequences of issuing options would have to be calculated instead (2211). This calculation would include the possible consequences if the Hydro could not fulfill its own obligations due to a high degree of ordered regulation from the WFs, and the consequences from having to deviate from the planned optimal production plan for the coming time periods. Since the production plan is forecasted to give optimal revenues, any disruptions to this plan would lead to lower forecasted revenues.

If the financial potential is worth the financial risk, the maximum volume of issued options and the least wanted price is calculated (2213), and offers are sent to the PX. If the potential is not worth the risk, no automatic transactions are done. Instead, the Hydro can manually consider to issue options hour by hour, when more information from better weather forecasts are obtained, which gives the Hydro a clearer image of the corresponding risks (2215). If a situation occurs where the options premium is worth the risk, the volume and wanted price is calculated (2217), and the offers are sent to the PX (2209).

If there are matching bids at the PX, a deal is triggered (2219). The PX then settles the option premiums between the participants. If there are no matching bids, the Hydro can choose to place more attractive offers.

During the production time period, production regulation orders are calculated by the PX and sent to Hydros that have been issuing options (2221). After the production time period, spot sales on the PX are settled by the PX (2223).

Figure 23:
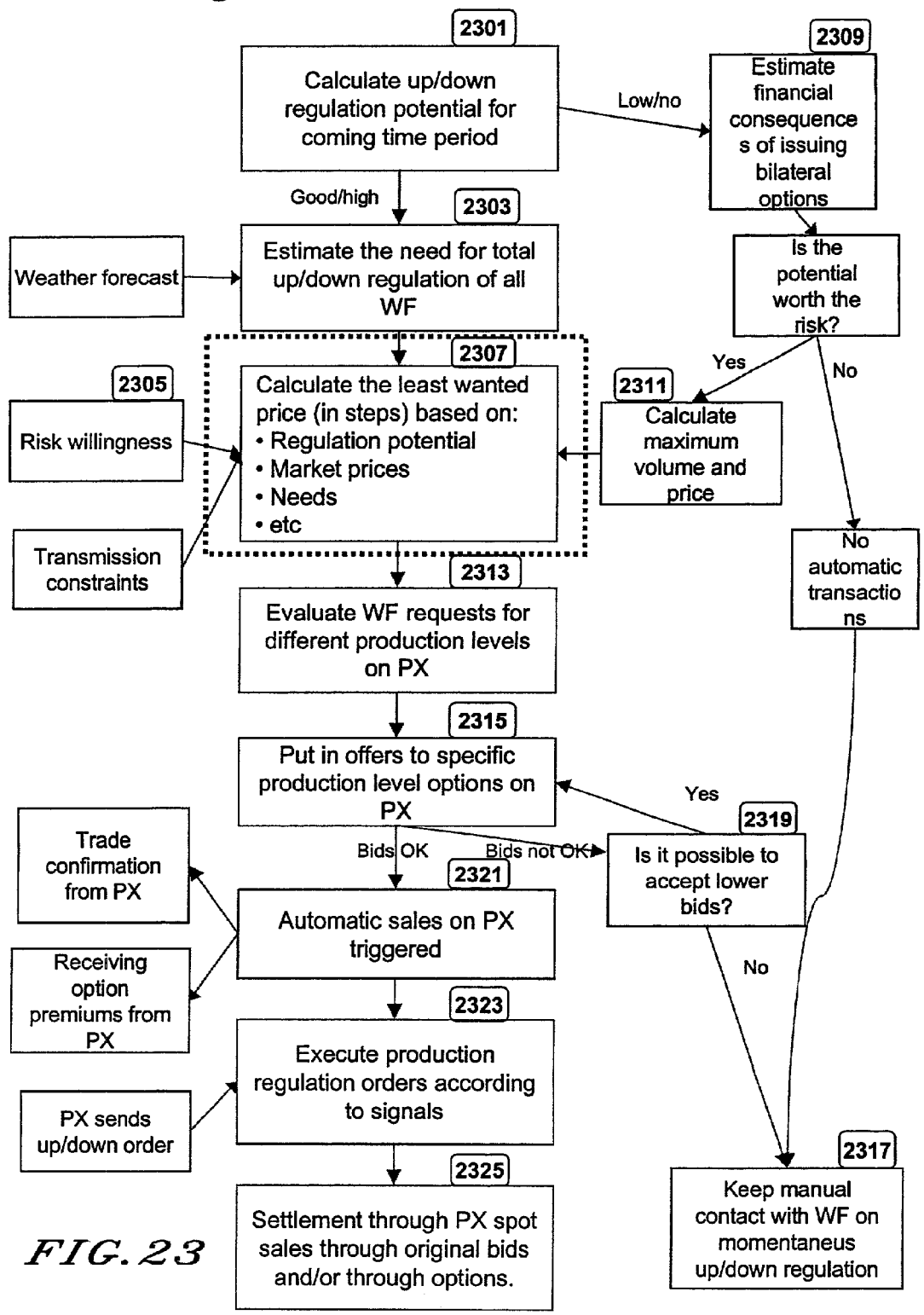
FIG. 23 is a chart showing a hydro perspective in a power exchange bilateral options market operations.

A Hydro-Bilateral options market embodiment is shown in FIG. 23. The Hydro continuously calculates its regulation potential for the coming time periods (2301). The regulation potential is influenced by the current reservoir level, the planned production level for the coming time periods compared to minimum/maximum production levels and the price level on the spot market compared to the price level on the futures market.

If the regulation potential is good, the present weather forecasts are used to calculate the forecasted need for total up/down regulation for all WFs in the market (2303). The total forecasted regulation need will determine the value of regulation potential, and thus set the price for regulation options.

The risk willingness of the Hydro (2305) depends on the willingness to accept financial risks and on the financial consequences of unplanned regulation. Further insights are found in FIG.17 as described previously. A Hydro with good regulation potential would suffer less from unplanned regulation, and would thus be more willing to take on risks from bilateral options.

The estimated total need for regulation, which in fact sets the price level for regulation options, together with the risk willingness of the specific Hydro, is input when the wanted price for issuing options is calculated (2307). In a situation with a strained transmission situation in the grid, possible transmission constraints also have to be taken into consideration since it will affect the possibilities to fulfill the obligations from the issued options. The wanted price for the regulation options are based on the market need for regulating power, the Hyrdos ability to issue options, and on the market price for different time periods. These factors are taken into consideration in a valuation model, that could be run automatically.

If the regulation potential in the first box (2301) on the other hand would be low, the potential financial consequences of issuing options would have to be calculated instead (2309). This calculation would comprise the eventual consequences if the Hydro could not fulfil its own obligations due to a high degree of ordered regulation from the WFs, and the consequences from having to deviate from the planned optimal production plan for the coming time periods. Since the production plan is forecasted to give optimal revenues, any disruptions to this plan would lead to lower forecasted revenues.

If the financial potential anyway is worth the financial risk, the maximum underlying regulation volume for the bilateral options and the wanted price is calculated (2311). If the potential does not seem to be worth the risk at the moment, no automatic transactions are made. Instead manual contact are held with WFs closer to the production hour, which gives the Hydro a clearer image of the corresponding risks (2317). This can later spawn a transaction if the price is right (2315).

In the bilateral options market, the WFs have submitted their need for power regulation, for different probability levels, to the PX (or directly to a Hydro). It is accordingly known to all Hydros the probability of different regulation needs for every specific WF for the time period. Based on the forecasted need for regulation (2313), the Hydros submit bids to match the regulation need of a specific WF (2315). The bilateral option that is offered would cover the whole regulation need for that WF, thus transferring all of the risk from the specific WF to the specific Hydro that issued the option.

If the Hydro cannot submit an offer that matches the bid from a WF, the Hydro can evaluate if it is possible to accept a lower bid (2319). If it is possible, new offers are submitted to specific WFs through the PX.

If the bids on the PX match the corresponding offers for a specific WF, an automatic deal is triggered (2321). The parties receive transaction confirmations and option premiums are settled through the PX. If a bilateral option deal is made manually with a counterparty, it could be cleared at the PX or stay purely bilateral.

During the production time period, production regulation orders from the specific WF are sent through the PX to the specific Hydros that have issued the bilateral option (2323). After the production time period, spot sales on the PX are settled by the PX (2325).

Risk Analysis and Quantification

Regarding renewable power sources such as wind power, there are specific risks and methods for quantification associated with Power Exchange (PX) traded options markets and bilateral traded options markets according to the invention. These markets specialize on trading options for green power as well as Virtual Energy Storage (VES) options for storing and withdrawing green energy. The options refer to a specific amount of energy for a specific time period. The counterparty is different depending on trading method as described below.

Risks for a wind farm (WF) include cost increases when production is higher or lower than previously committed volume. The risk can be illustrated with a pdf describing EV of production and the possible distribution of production as FIG. 16. Risk is calculated as the increased cost (penalty or repurchase costs) as a function of changes in production during the time period compared to earlier committed production (100). Risk and an expected volume profile (101) can be combined in a diagram showing the probability of a cost occurring (102). The company will then decide on the wanted remaining risk: "The risk of a cost over x $ for the period should be lower than 5%", which is illustrated by the vertical line (102). It would be prudent for the company to purchase options to cover these risks. The company will purchase a sufficient number of options to make sure the risk is within the anticipated level.

Regarding hydroelectric power, there is a basic assumption that Hydro producers are and act financially rationally. This means that production previously has been planned to an optimum with regard to possibility to sell put and call options for green power, future prices and volume restrictions. All changes in this production plan are negative to Hydro. Hydros are faced with at least the following risks: changes in production plans that leads to less favorable prices; and changes in production plans that leads to a risk of future water spills, which represent a waste of potential energy.

The risks for the Hydro producer will be reflected in the wanted price of the option, and can be calculated as follows:

> Issuing call options: (Difference between the price if no extra energy was produced in the production unit this hour–actual spot price received)+(cost if this would lead to spill of water in the future) =Minimum price of option (a threshold); and > Issuing put options: (Difference between the expected price received in the future on power not produced now (purchased now) and the current spot price)+(cost if this would lead to spill of water in the future)=Minimum price of option (a threshold).

The price of the option will also be affected by the current season (summer or winter); and aggregated market demand for up/down regulation due to uncertainty in winds.

Hydros will make sure that the premium for the accepted risk is high enough, otherwise they will not offer any options on the market. Short-term options (for coming 24 hours) have no need for continuous risk measurement, the calculation is done when selling and no further calculations are made. Risks with sold long-term options need to be calculated continuously. The method is similar to the one described below.

Regarding VES, the charge for VES usage could be a fixed cost or fixed cost plus charge for volume. A capacity fee when having large positive or negative balances could also be charged.

A WF uses a VES to store surplus electricity and withdraw when they have a lower production. The value of stored electricity is the price of electricity when withdrawing from the storage. The possibility to store wind produced electricity is also worth the premium for converting unreliable wind power to firm green power. WFs use VES to manage uncertainty in volume. Risk, and therefor the willingness to pay for reducing the risk will be calculated the same way as for options above but should be regarded as a series of risk calculations for 1 . . . N time periods.

Hydros offering VES will calculate three risks, volume, price and risk of non-optimal usage (FIG. 17). The risk situation will be calculated using previous VES agreements and analyzing the consequences of adding new. The various risks for Hydro offering VES can be calculated as follows:

Volume risk including the uncertainty in purchase and sale (input and output in VES) for two random counterparties (1701 and 1702). All commitments to 1 ... N counterparties are summed to calculate the aggregate uncertainty in volume, leading to a risk that all contracted VES deliveries or purchases can't be made. If maximum delivery or purchase in a specific time period occurs (1703), options for green energy have to be purchased to reduce the risk; and Price risk including the uncertainty in value of input and output to VES from counterparty (1704 and 1705). Input to VES is possibly subject to an uncertainty in price, as well as the output from VES. The timing between input and output also gives a price risk. The net uncertainty in each time period is discounted to current value. The Hyrdos' risks will be used when pricing new VES contracts, so high risks in ongoing contracts will affect the future price of new VES contracts (1706).

There are various pricing possibilities for input and output to VES, the transfer price:
   Spot price for time period—the price of which surplus energy is supplied to the PX by the WF, on behalf of the Hydro, and vice versa is the spot price for the time period;
   Fixed price for contract period—there is a fixed price for the contract period that fixes prices for transactions under the VES contract;
   No price—there is no price for any VES transactions;
   Differential—spot price differences when purchasing and selling to the VES will be adjusted for so that no participants' received price will be affected.

This implies various levels of price risk for Hydro but the same methods for calculation of risk are used. When using spot price the price risk will be the price difference between input in VES and output from VES. This will give a non-controllable price difference for Hydro which is a non-desirable risk. When using a fixed price there will be no price risk for Hydro. When using no price, there will be no price risk for Hydro, there will be a cash flow unbalance though, but the effect is small for both parties. If adjusting for spot price differences there will be no price risk for Hydro.

Risk of non optimal production planning concerns the net sales from VES for one time period and the expectations on VES usage during the time period (1707). This uncertainty is the same as volume risk (1703). EV is the current optimal production plan. There is a cost associated with changes in this production plan (1708) and this results in a probability that a certain cost of VES contracts (1709).

There is always a volume risk that all VES contracts will execute simultaneously in the same direction so that all contracted VES deliveries cannot be made. The alternative for Hydro is to purchase options as above to deliver to a VES holder.

By providing, in a reliable fashion, units of electrical power that are at least partially derived from the wind farm 503, enables the wind generated electrical power to be on par with other types of power in a commercial setting. The present inventors have recognized that by making this power reliable both in terms of the quality of the power provided to the grid, and also in terms of the contractual reliability with which the wind power may be provided to the grid by relationships with virtual energy storage facilities, wind power units may also be traded on a power market. As previously discussed, the power exchange 509 includes long term contracts for providing predetermined amounts of power to the grid. Thus, by being able to have guaranteed certain output levels of power from the wind farm, the wind farm operator may also participate in this power exchange by entering into forward contracts. It should be stated that while the present invention discusses wind power as a preferred embodiment it is also applicable for solar power for example or other time varying power production facilities.

Another feature made available by the present invention is the creation of a renewable power exchange 507, which includes units of power that may be traded from power production facilities that use renewable sources of power (solar, wind, hydro, for example). The renewable exchange is based on the principle that if certain power production facilities can reliably predict the amount of power they can produce at any given instant in time, then contractual relationships may be formed and units of power, that are perhaps guaranteed by way of options contracts, may be traded in a forum such as in a power exchange for renewable energy sources. The renewable power exchange will be based on the principle that units of power for some given period of time produced by the wind farm, may be predicted with a certain degree of accuracy, based on meteorological data source and prediction tool 513.

This meteorological prediction tool 513 provides a statistical probability indicating the likelihood of the wind farm actually producing the amount of power contracted for a given period of time. Based on this prediction, it is the availability of that information that is reviewable by different market participants at the renewable power exchange, bidding is done on the unit of wind power energy produced by the wind farm at some given period of time.

Due to wind power being "green", this type of power is highly desirable and financial incentives are sometimes offered by different governments to provide this type of power, or even quotas placed on power providers for providing a certain amount of green power as part of their energy portfolio. By providing units of power that are available for sale, including the statistical likelihood of the reliability of providing that power, market participants in a renewable power exchange 507 may purchase the units of power from wind farm as a forward option. Market participants may include other wind farm operators such as the third party wind farm 517 who seek to increase the likelihood of delivering power for their respective contractual obligations by accumulating more power production resources. Other operators such as thermoelectric plant 515 or hydroelectric plant 511 operators may also purchase the units of wind power and use the control center processor 500 as a mechanism for guaranteeing that the hydroelectric plant 511 or thermoelectric plant 515 can increase its production in the cases when the wind farm in fact has a lull in wind and cannot produce the required amount of wind generated electric power. Likewise, the other operators may purchase from a wind farm operator a surplus of potential energy saved in the wind farm operator's virtual energy storage account. The potential energy assets will tend to accumulate in the wind farm operator's account if the wind turbines experience a greater than predicted amount of wind.

The price that a hydroelectric plant operator (or other type of operator) would be willing to pay would be a function of the level of renewable energy resources they presently have collected, or as a result of their optimization process, predict to have in the future. For example, the price a hydroelectric plant operator would be willing to pay for wind energy would be relatively high if the water reserve at the hydroelectric plant is relatively low or below expectation levels for that particular time during the season. The water reserve is here the reservoir volume minus possible VES contract volumes. On the other hand, if the hydroelectric plant operator has a larger than expected surplus of water reserve, and may even have to spill some of the water, it is unlikely that that hydroelectric plant operator would be willing to pay much for the power produced at the wind form operations with power produced at the wind farm operations and in store in the reservoirs. On the other hand, thermoelectric plant operators would, on a unit-by-unit basis, be willing to pay for the green units of wind power in order to meet their governmental regulations. Purchasing units of power from a wind farm operator also saves on fuel, provided that the output levels and cost from the wind farm are sufficient to offset their reserve of fossil fuels.

The risks minimization and insurance mechanism 555 receives data through the I/O of the renewable energy control processor 500. Alternatively, the risk minimization and insurance mechanism 555 may operate independently of the renewable energy control center processor 500. Likewise, the renewable energy control processor 500 may be configured to include the risk minimization and insurance mechanism 555. Features of the risk minimization and insurance mechanism 555 that would govern whether it could be hosted in other computer facilities (such as included as part of the power exchanges 507 or 509, or as stand alone units) include, as shown in FIG. 3, a processor 357 that connects via a bus 359 to other components, internally, as well as through an interface to outside actors as will be discussed.

Figure 3:
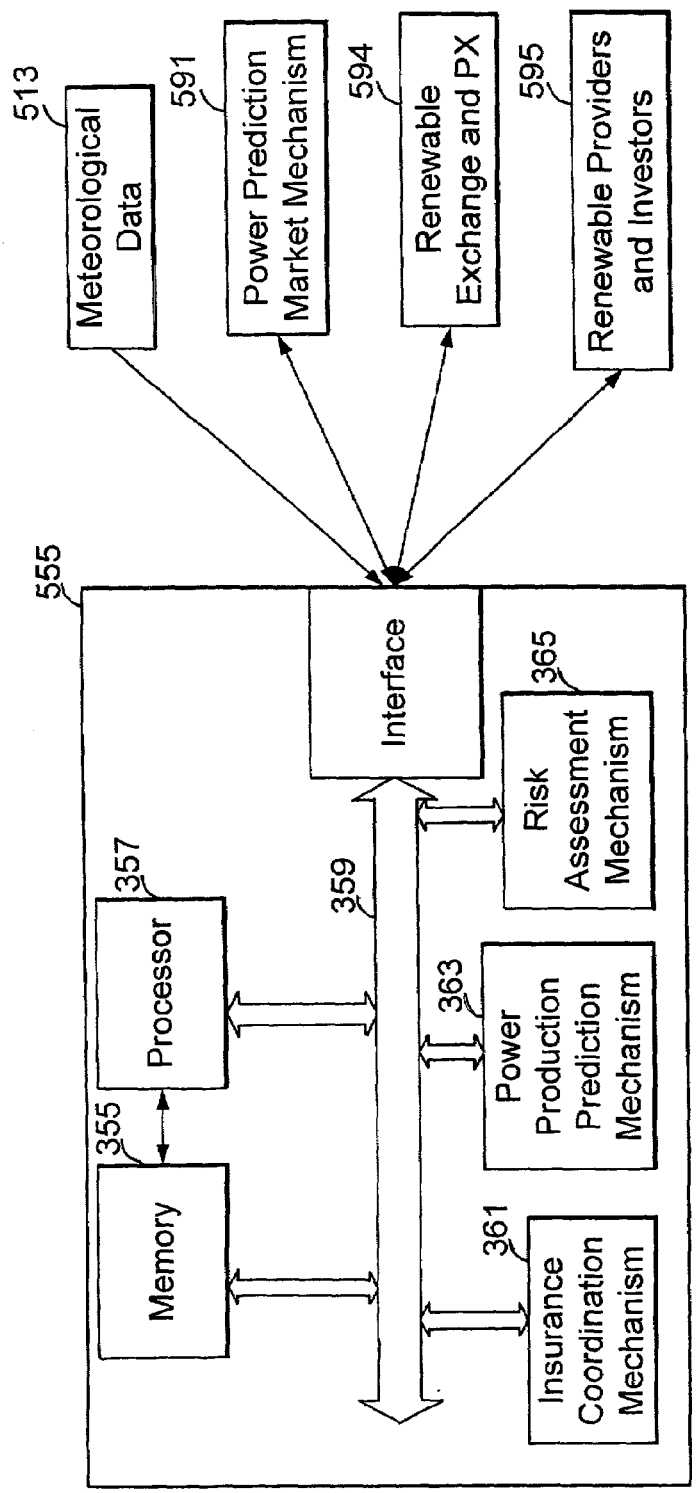
FIG. 3 is a block diagram showing features of the risk minimization and insurance mechanism of FIG. 2.

As shown in FIG. 3, the processor 357 connects via the bus 359 to a memory 355, which holds computer readable instructions therein that are able to perform the communication operations with outside devices, as well as implementing the insurance coordination mechanism 361, power production prediction mechanism 363, and risk assessment mechanism 365. Furthermore, the computer readable instructions originally held in the memory 355 and ultimately executed on the processor 357 are able to implement the computational steps in the processes of FIGS. 18-23 previously discussed. The interface of the risk minimization and insurance mechanism 555 connects to the meteorological data source and service 513 for receiving meteorological data about the present, as well as perhaps future and past meteorological data local to the site where the renewable facility is located, as well as more macroscopic meteorological data that may influence the forecast provided by forecasting prediction mechanisms (which may be a manual process). A power prediction market mechanism 591 is a computer-based market (although alternatively a manual process may be performed as well) for making available forecast data, that may include forecasts on power production levels from specific renewable sites as well as other sites. More of the details of the power prediction market mechanism 591 are discussed in the process flow of FIG. 4.

The interface also interconnects to different exchanges, which include the renewable exchange and the power exchange 594. The forecast data as well as the power production prediction mechanism and risk assessment mechanism 365, provide data to the renewable exchange in PX 594 (in FIG. 3, shown separately as 507 and 509 in FIG. 2), and pricing information provided by the renewable exchange and the PX are provided to the risk assessment mechanism 365, for identifying predicted prices for present and future sales of power to be produced by a particular renewable facility. Finally, the interface creates a connection to renewable providers and investors 595, as well as other actors who may have an interest (financial or otherwise) in obtaining data regarding the likelihood of certain power production levels being met by a wind farm (or other type of renewable) at a certain time in the future. By receiving information from the providers and investors 595, the renewable providers and investors will help minimize their own financial risk by having better quality data and being able to identify when it is necessary to identify whether the investors or renewable providers need to hedge their investments, by seeking back-up power, to the extent the renewable providers and investors will be investing in power to be produced by renewable sources in the future.

The power production prediction mechanism 363 has the function of predicting the amount of power output by a particular renewable facility at some predetermined time in the future. Through ensemble forecasting, the meteorological actors may provide an estimated probability for the size of the prediction error. The meteorological ensemble forecasts are a set of forecasts starting from slightly perturbed initial conditions. Through the strong non-linearity of the atmospheric motion systems a spread in forecasted variables results. This spread may be taken as representing the range of uncertainty due to erroneous inputs, and due to errors in forecast model formulations. By relating this error to the prices at the power market, a financial risk assessment is possible. This assessment can be refined using software simulation scenarios e.g. following the approach by Meibom et.al. (cited previously), but on time-scales relevant for the prediction period. The range of power production predictions obtained by combining the meteorological forecast uncertainty with a calculation of power production for a given wind energy turbine is combined with the pricing at the energy exchange. The financial impact of a meteorological forecast error is then obtained. Based on this knowledge, a market for power production predictions is formed. The knowledge is also helpful to the usage of the VES business model discussed above an in U.S. patent application Ser. No. 09/749,999. A value of the financial risk connected to putting power production options on the energy exchange is obtained.

The risk assessment mechanism 365 receives the output from the power production prediction mechanism 363, in the form of a statistical description of the likelihood of predetermined levels of power production from the renewable facility over some period of time. The power production prediction mechanism 363, also provides a related expected price to be paid for that power if sold in an open market system such as the renewable exchange and PX 594 (FIG. 3). The power production prediction mechanism 363 makes this estimate of pricing information as described above in the section on risk analysis and quantification. With this pricing information, including the statistical indicator regarding the variants of the pricing information, the risk assessment mechanism 365 can then determine whether a back-up form of power is required or at least the option to supplement the renewable power output with power that may be produced via a VES. The greater the variance in the forecasting results, the greater the uncertainty regarding whether a full delivery of power from the renewable facility will be achieved. As a consequence, greater price risk is available for investors and the power provided by the renewable facility.

The insurance coordination mechanism 361 keeps track of the statistical accuracy with regard to the past forecasts. Depending on how accurate the forecasts have been, the insurance coordination mechanism 361 will provide either prompts to a user of the risk minimization and insurance mechanism 555, requesting whether insurance would like to be obtained or not to offer to offset financial risk for providing a faulty forecast. If so, the insurance coordination mechanism 361 sends a message to a previously identified insurance carrier, who previously agreed to issue financial insurance for providing forecast data that was used in a particular trade. The insurance coordination mechanism 361, may also include an automated feature, which is applicable when a user of the risk minimization insurance mechanism 555 already decides that insurance should be obtained either for the investors themselves, or for the forecaster, to guard against a risk of legal liability should a cause of action be raised against the forecaster for providing faulty information.

However, another type of insurance provided by the insurance coordination mechanism 361, is the coordination of a contract with another energy provider so as to provide supplementary energy in the case that the production is below a previously predicted level. In this way, the insurance coordination mechanism 361, can either "on the fly", or through a previous arrangement, place a request to the VES as a back-up source of power, should there be a shortfall.

Figure 4:
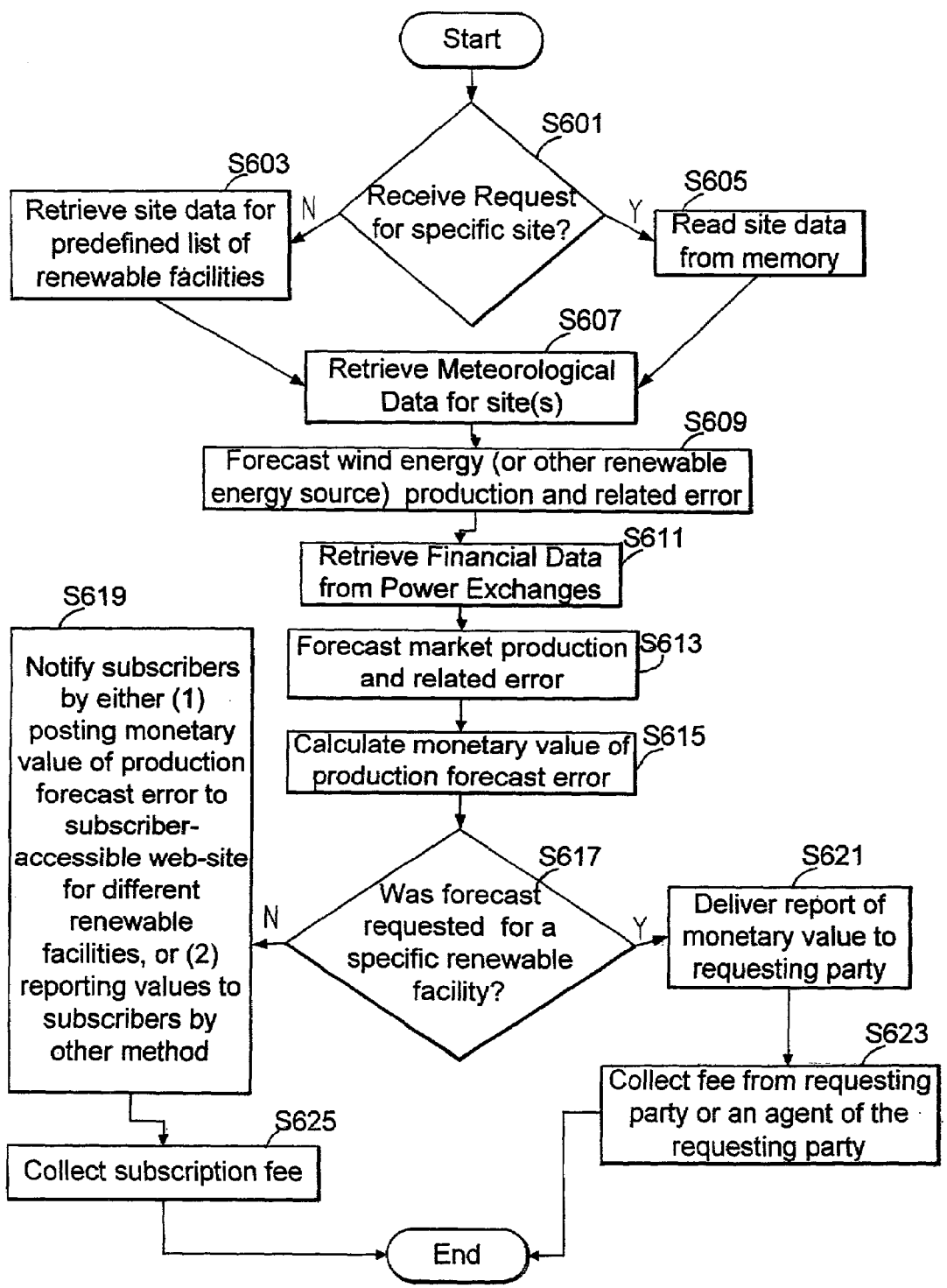
FIG. 4 is a flow chart describing a process flow according to the present invention, for providing forecasts and reports, including monetary values associated with power production affected by the forecasts, to a requesting party.

FIG. 4 is a flowchart describing the mechanism for the power prediction market and the activities of the power production market. This market is driven by parties that make a specific request regarding a specific renewable facility, as well as for general reporting purposes on a number of renewable facilities. The process begins in step S601 where an inquiry is made regarding a request that was received for providing the report on a specific renewable facility site. If the response to the inquiry is yes, the process proceeds to step S605 where specific site data is read from memory. The site data at least includes location, power production capacity and whether there are existing VES arrangements (either contractual, or through ownership, or joint venture, via a common owner for example). If the response to the inquiry in step S601 is negative, the process proceeds to step S603, where similar data as that obtained in step S605 is obtained, however the data is for a predetermined list of renewable facilities. For example, the predetermined list of renewable facilities may be the most popular renewable facilities for investment by private investors. As a consequence, these investors may like to periodically receive updates on a likelihood of their particular facilities meeting or exceeding the expected production forecast from an earlier date.

After either step S605 or step S603, the process proceeds to step S607 where meteorological data is obtained for the relevant sites. The meteorological data includes not only data provided from local sensors, but also from nearby wind farm sensors, meteorological network sensors, as well as national meteorological facilities, like those discussed in reference to FIG. 36 of U.S. patent application Ser. No. 09/749,999. With the meteorological data, a forecast of the wind energy (or other type of renewable energy source) is made as well as the identification of the related error associated with that forecast.

The process then proceeds to step S611, where financial data is retrieved from the respective power exchanges. The process then proceeds to step S613, where a forecast is made of the market production (the amount of power expected to be produced) and the associated related error distribution. The process then proceeds to step S615, where a monetary value of the production forecast error distribution is calculated as described in the above section on risk analysis and quantification. The process then proceeds to step S617, where an inquiry is made regarding whether the forecast requested was for the specific renewable facility. If the response to the inquiry is affirmative, the process proceeds to step S621 where a report of the monetary value of the forecast production is provided, along with the related error to the party who made the request. The process then proceeds to step S623, where a fee is collected from the requesting party or an agent of the requesting party and subsequently the process ends. It should be noted that the delivery of the report may be in any one of a variety of forms, including electronic communication (e.g. e-mail, or even a web posting), but may be by other techniques as well such as even by telephone or by mail. If the response to the inquiry in step S617 is negative, the process proceeds to step S619, where the subscribers are notified by either posting the monetary value of the production forecast error to a subscriber accessible web site for the different renewable facilities, or the value is reported to subscribers by other methods. These other methods may include specific electronic messages sent to the subscribers (e.g., e-mail), or by postal mail or the like. The process then proceeds to step S625 where periodically a subscription fee is collected from the different subscribers and then the process ends.

Since risk is taken care of through the present invention, a producer or trader of renewable power on the market may go for a better price on the power exchange than he would be able to obtain in a bilateral agreement. Using the possibilities of the Virtual Energy Storage system, as described in U.S. patent application Ser. No. 09/749,999, the actor is able to enter obligations holding a larger risk since he may, via options, protect himself against renewable production fluctuations. The price setting is determined by the production, transmission and consumption scenario, and by the risk associated with renewable power prediction uncertainty. Assessment of the risk is described above and forms an integral part of the present invention. This risk calculation and evaluation is automated in the wind power prediction system such that when a preset level of risk is exceeded, a signal is transmitted to the producer, trader, or other party on the market. This signal triggers a contractual procedure in which an obligation for backup delivery of power is marketed or purchased.

Now, turning to FIG. 5, the process begins in step S1001, where a forecaster provides a forecast of the wind energy production and its error probability. The process then proceeds to step S1101, where the production forecast is marketed together with the error information. Alternatively, the process may proceed (either alternatively, or in parallel), to step S1201, where a forecaster also calculates monetary value of the production forecast error. When the process completes step S1201, the process then proceeds to step S1203 where an inquiry is made regarding whether the monetary risk of guaranteeing the forecast is too large (relative to a predetermined threshold that may be fixed, or also user-settable). If the response to the inquiry in step S1203 is negative, the process proceeds to step S1205, where the production forecast is traded. If the response to the inquiry in step S1203 is affirmative, the process proceeds to step S1209 where a back-up power delivery option is purchased by the forecaster so as to supplement the production forecast. This would occur, where the investor or the one responsible for actually delivering the predetermined amount of power, obtains a certain amount of insurance in the form of back-up power delivery should the production forecast be more optimistic than the power that was actually produced. The process then proceeds to step S1207, where the production forecast is traded with a guarantee. In step S1207, optional insurance may be purchased through an insurance policy for the forecaster so as to avoid legal risk to the forecaster in the event of an erroneous production forecast. The amount of insurance required reduces with a corresponding increase in the amount of back-up power delivery option (amount of power to be delivered) purchased.

Turning to step S1101, the output then proceeds in parallel to three different steps S3001, which is reception at a power exchange, S3003, a wind power producer, and step S3005, where a hydropower producer receives the production forecast information.

After Step S3001 the process proceeds to Step S3007, wherein the risk of grid imbalance is determined in terms of $\Delta f$ and $\Delta W$ by notifying the system operator of the possibility for grid imbalance, which helps facilitate the planning process for the system operator so as to avoid a risk of having grid imbalance, thereby giving rise to a possible load shedding requirement.

The wind power producer in Step S3003 then calculates the monetary value of production forecast error in Step S3009. Alternatively, the monetary value of production forecast error may be calculated by another entity and simply provided to the wind power producer. After Step S3009 the process proceeds to Step S3015 when an inquiry is made regarding whether the monetary risk is larger than a predetermined level. If the response to the inquiry is negative, the process proceeds to Step 3013 where the forecasted wind energy production is then made available for trading on a market such as the renewable power exchange or the power exchange itself. On the other hand, if the response to the inquiry in Step S3015 is affirmative, the process proceeds to Step S3017 where the wind power producer (or an agent thereof) purchases a backup power delivery option from a virtual energy storage facility. Alternatively, a preexisting contractual arrangement may be in existence with the VES so that all that is needed is to notify the VES of the probability of having to receive a surplus produced by the wind power production unit (renewable power production unit) or cover a deficit in wind power production (renewable power production). The process then proceeds to Step S3019 where the forecasted wind energy production, backed by the VES delivery option, may be sold on the market.

With regard to a hydropower producer in Step S3005, the process proceeds to Step S3011, where the monetary value of production forecast error is calculated, as was the case with S1201 and S3009. The process then proceeds to Step S3021 where an inquiry is made regarding whether the storage of energy is sufficient to serve as a market backup for a power delivery option. If the response to the inquiry is negative, the process proceeds to Step S3023, where the VES does not offer backup power delivery options. On the other hand, if the response to the inquiry in Step S3021 is affirmative, the process proceeds to Step S3025 where the backup power (VES) delivery option is sold on the market. Subsequently the process ends.

Figure 7:
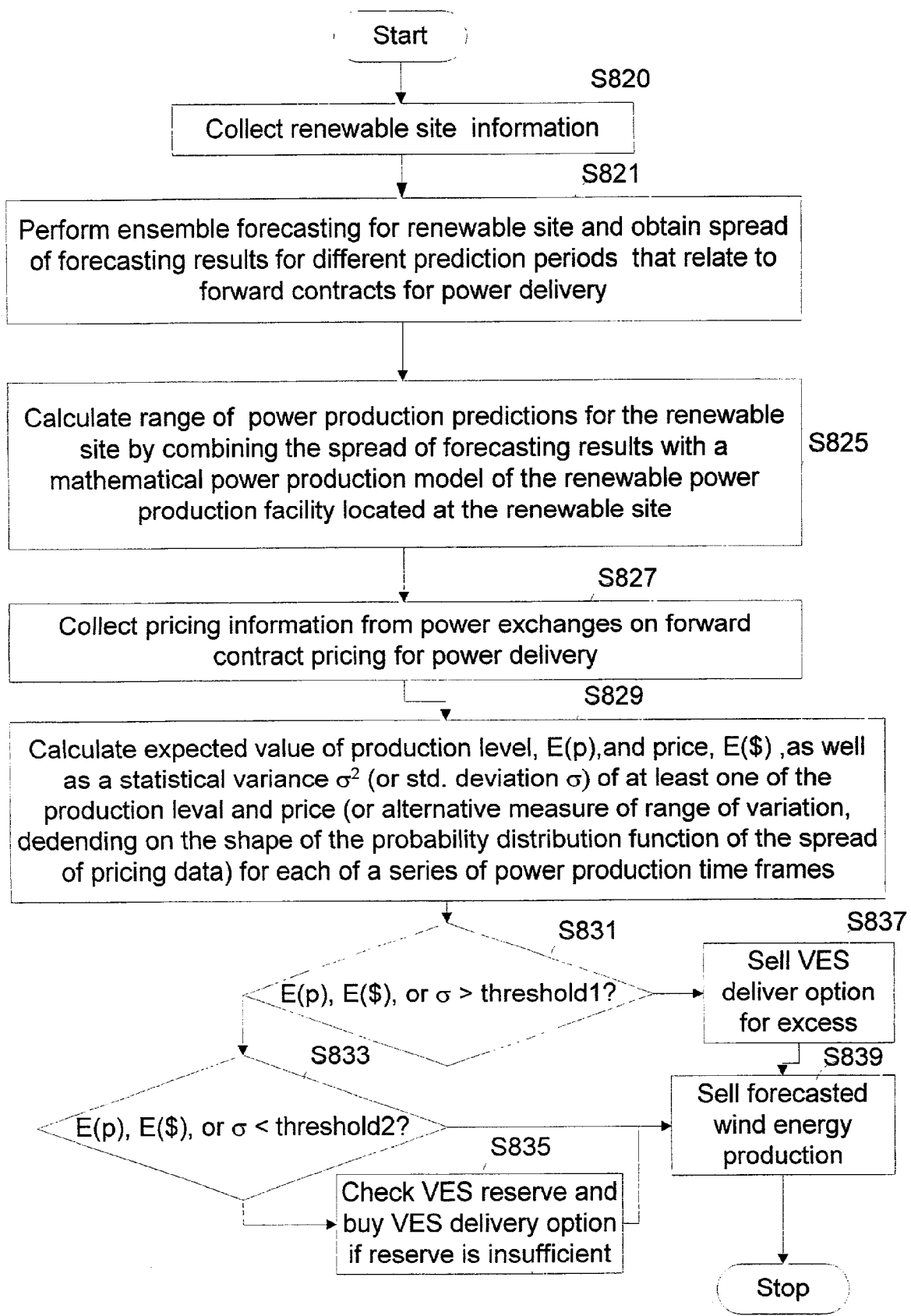
FIG. 7 is a flow chart according to the present invention, and describes a process flow for associating forecasting risks with monetary values of quantities of energy produced at predetermined future periods of time and a logic flow for adjusting an action in the event that respective price or production levels are above or below certain predetermined thresholds.
Figure 9:
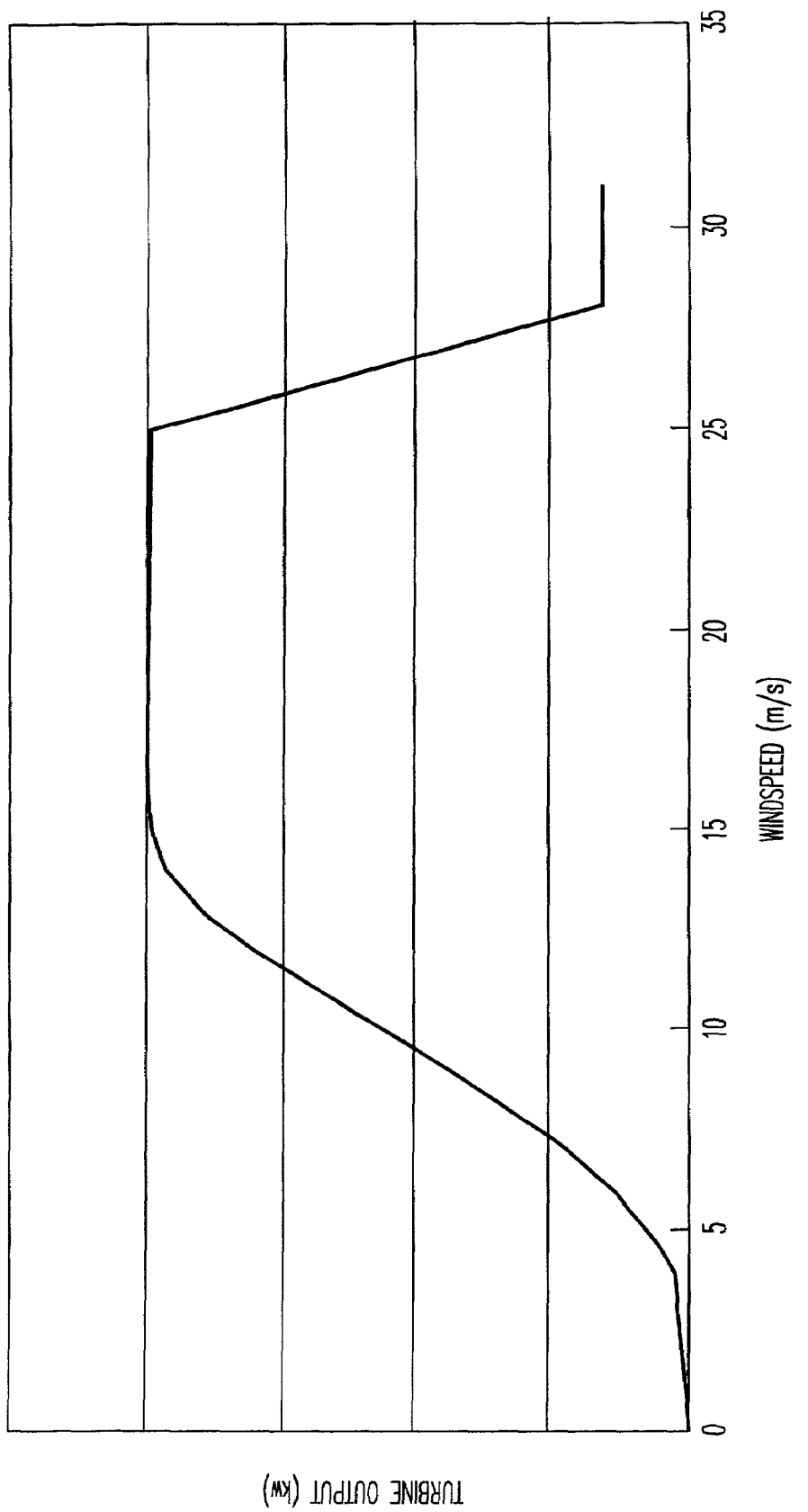
FIG. 9 is an exemplary power curve of wind turbine output (kW) versus windspeed (m/s) for a wind turbine facility

FIG. 7 is a flowchart describing some of the sub steps on Step S1001 of FIG. 5 for example. The process begins in Step S820 where the information regarding a particular renewable site is collected. The process then proceeds to Step S821 where an ensemble forecast is performed for that specific site. The ensemble forecast enables a spread of forecasting results to be obtained for different prediction periods. These forecasting results relate to forward contrast for power delivery at predetermined times in the future. The process then proceeds to Step S825 where the range of power production predictions are calculated for the renewable site by combining the spread of forecasting results with a mathematical power production model of the renewable power production facility located at the renewable site. One example of such a production model, for in this case a wind turbine, is shown in FIG. 9. The process then proceeds to Step S827 where pricing information from the various power exchanges on forward contract prices for a power delivery are collected.

After the ensemble forecast is performed and the pricing information has been collected, the process proceeds to Step S829. In Step S829, an expected value of production level E(P) is obtained, as well as price E($), and perhaps statistical variance $\sigma^2$ or a standard derivation $\sigma$ of at least one of the production level and price. Moreover, using a probability density function, pdf, (or a cumulative distribution function), an expected value of the production level and price may be determined directly from a combination of the probability density function obtained from the ensemble forecast and the power output capabilities of the particular renewable site. Having the pdf enables the calculation of an expected value, as discussed in De Neufville, R., "Applied System Analysis: Engineering Planning and Technology Management", 1990, page 316, specifically, and more generally with regard to risk assessment decision analysis, pages 272-323, the entire contents of this book being incorporated herein by reference. It should be noted that the statistical variance, $\sigma^2$, is only one type of stochastic measure that may be used to characterize variability of wind power production. Other statistical techniques could be used as well, such as those described in DeVore, J, "Probability in Statistics for Engineering in the Sciences", Brooks/Cole Publishing Company, 1987, the entire contents of which being incorporated herein by reference.

The process then proceeds to Step S831, where an inquiry is made regarding whether at least one of the expected value of power production (E(P)), expected price (E($)), or standard deviation (or variance) is above a predetermined threshold1, for that variable. When threshold1 is exceeded, the process proceeds to Step S837, where the excess power may be sold (or kept on account) with a VES as part of a delivery option for the excess expected power to be produced above threshold1. Subsequently, the process proceeds to Step S839, where the predicted amount of energy is sold on the market, and then the process stops. On the other hand, if the response to the inquiry in Step S831 is negative, the process proceeds to Step S833, where an inquiry is made regarding whether the statistical indicator is less than a second threshold, threshold2. Threshold2 is lower than threshold1, and if the expected power production is less than threshold2, then it would behoove the investor or wind power producer, to ensure that a backup delivery option is contracted, possibly from a VES. When relying on VES for the backup delivery source, as shown in Step S835, first the availability of reserve energy at the VES is checked and then if sufficient, the option to obtain excess power from the VES is reserved for supplementing the possible shortfall from the renewable power provider. Subsequently, the process proceeds to Step S839 as discussed before. Similarly, if the response to the inquiry in Step S833 is negative, thus indicating that expected power delivery is above threshold2, then the process proceeds directly to Step S839, where the forecasted wind energy is sold. Subsequently the process stops.

Figure 8:
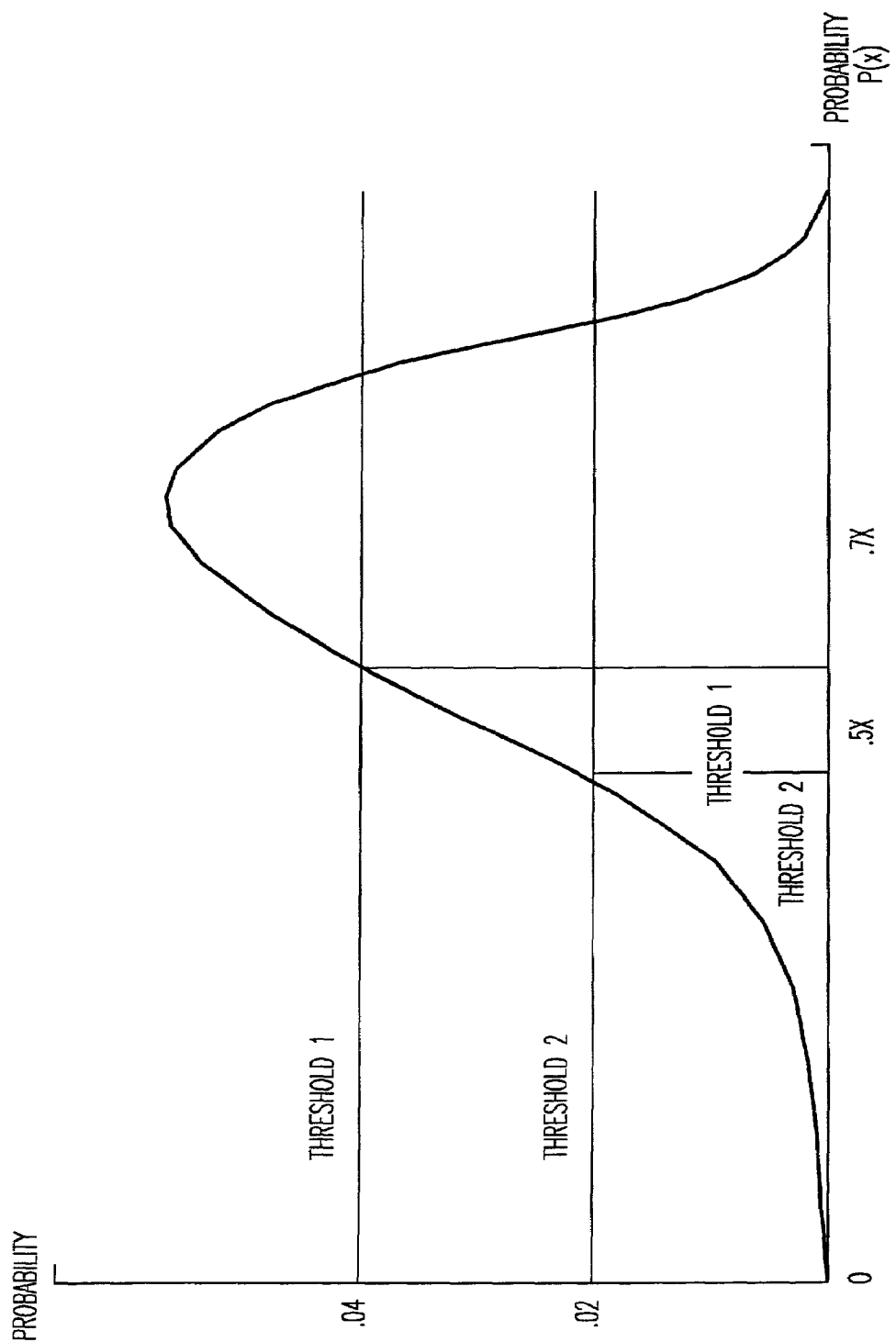
FIG. 8 is a probability density function diagram, showing how certain power outputs from renewable facilities, as forecast according to meteorological data, known to include errors, and how different probability levels within the probability density function, may be used as triggering mechanisms for triggering certain actions taken by actors in the power market.

FIG. 8 is a probability density function of the power output from a renewable facility at a predetermined time frame. The specific shape of the pdf will be unique to a particular set of forecast data. The one restriction on pdf is that the area under the curve must sum to 1. The pdf curve in FIG. 8, shows that a peak probability occurs somewhere in the neighborhood of 75% of nominal production (X). The spread of the pdf will indicate an amount of variance of the predicted power output, i.e. the probability of a certain deviation from the expectation value. Larger variances, indicating a larger range and thus greater uncertainty with regard to whether the predicted power will actually be deliverable or not. As shown in FIG. 8, threshold1 and threshold2 are set at different power output levels. If the probability of exceeding a given power output (or expected monetary value) is what is indicated by threshold1, then an excess amount of power is available for delivery. Likewise, if it is determined that the spread, i.e. uncertainty, in power production deviates more from the expectation value than as would be limited by threshold2, then it would appear necessary to attain backup power delivery option for a purchase.

Trading Power Options and Power Predictions on a Renewable Exchange

With the addition of a large volume (e.g., 10's of percentage of the total share) of fluctuating renewable power production like wind energy a new situation and new possibilities emerge for the energy exchange business. The risk associated with trading of wind power based on meteorological predictions opens a possibility to trade with both predictions and to price hedging using risk assessment based on prediction uncertainty and future load scenario.

The incentive for an actor on the market is based on the business opportunity and the risk of engaging into business contracts. For an actor, like a national weather service or a meteorological consultant, the business opportunity is given by the monetary value of forecasts. The larger the probability of an erroneous forecast is the lower is the market value of the forecast. In order to claim validity of a forecast the meteorologist takes a risk. In order to insure him/her-self against possible financial penalties and at the same time keep prices on forecast services up the meteorologist may take part of the option trading.

Power Exchange Balancing Function

The prediction uncertainty coupled to meteorological forecasts of wind power production leads to a risk. This risk is present for the individual trader as well as for the power exchange itself, or any sub-system of it. For the individual trader it primarily generates a need for purchases of power delivery options, e.g. through the virtual energy storage, VES, in order to avoid risk of loss of income, or possible penalties for not delivering contracted sales of wind power. For the power exchange it primarily leads to a risk of grid imbalance. The prediction uncertainty is for the exchange measured in terms of a 'power production differential', $\Delta W$. The differential is the difference between forecasted production and the actual production that due to the forecast error probability may result. The relevant measure being e.g. MW. Different areas of the grid may due to different amount of installed wind power capacity and different forecast error probabilities have different power production differentials, $\Delta W$.

Each wind power production unit will have a $\Delta W$ associated with it. So will each wind farm, as well as each region of the grid with wind farms attached to it. A global $\Delta W$ results by summation of sub-system $\Delta W$.

The acceptable level of global $\Delta W$ is coupled to the acceptable level of frequency fluctuation, $\Delta f$, through the stiffness of the grid. This accepted level forms an indicative signal for $\Delta W$ of the power exchange. If $\Delta W$ values exceed accepted levels trading agreements for wind power and virtual energy storage will need to be adjusted to meet the acceptable levels.

Figure 6:
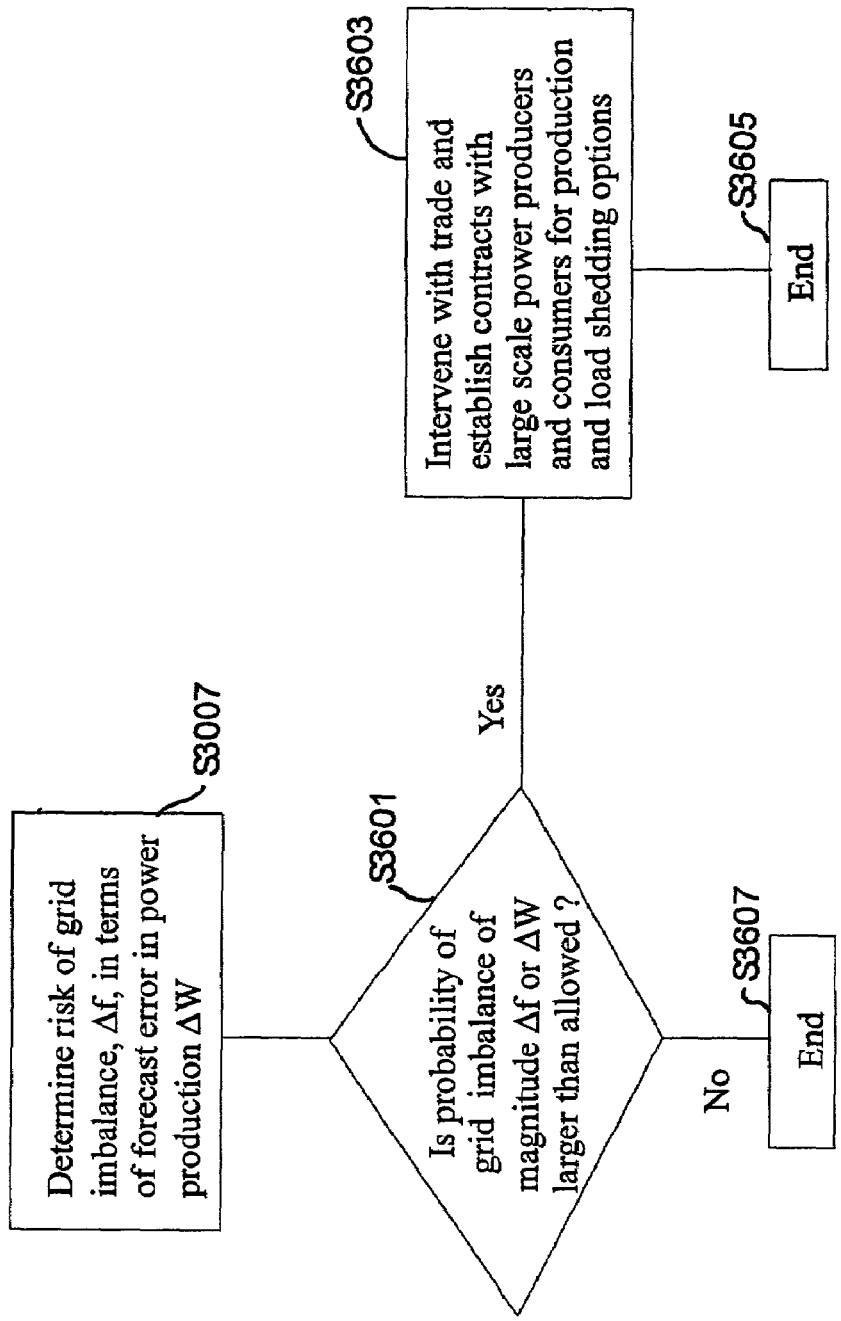
FIG. 6 is a flow chart of a process according to the present invention that describes a chain of activities leading from a power production forecast including an assessment of how possible forecasting errors may effect actions by grid operators in order to maintain an appropriate grid balance.

FIG. 6 is a flowchart that includes process steps for mitigating risks associated with grid imbalance that may arise due to some production shortfalls. The process begins with step S3007 where the risk of grid imbalance in terms of $\Delta W$ and $\Delta f$ are determined. The process then proceeds to step S3601 where an inquiry is made regarding whether the probability of grid imbalance of magnitude $\Delta W$ or alternatively $\Delta f$ is larger than allowed (e.g. greater than a predetermined threshold). If the response to the inquiry in step S3601 is negative, the process proceeds to step S3607 where the process ends. On the other hand, if the response to the inquiry in step S3601 is affirmative, the process proceeds to step S3603 where, based on the likelihood of grid imbalance, the grid operator establish contracts with large scale power producers or perhaps consumers, allowing triggering of production and load shedding alternatives. By this, balance responsible operators are provided means to interfere with trade dynamics so as to insure themselves against grid imbalances.

Figure 10:
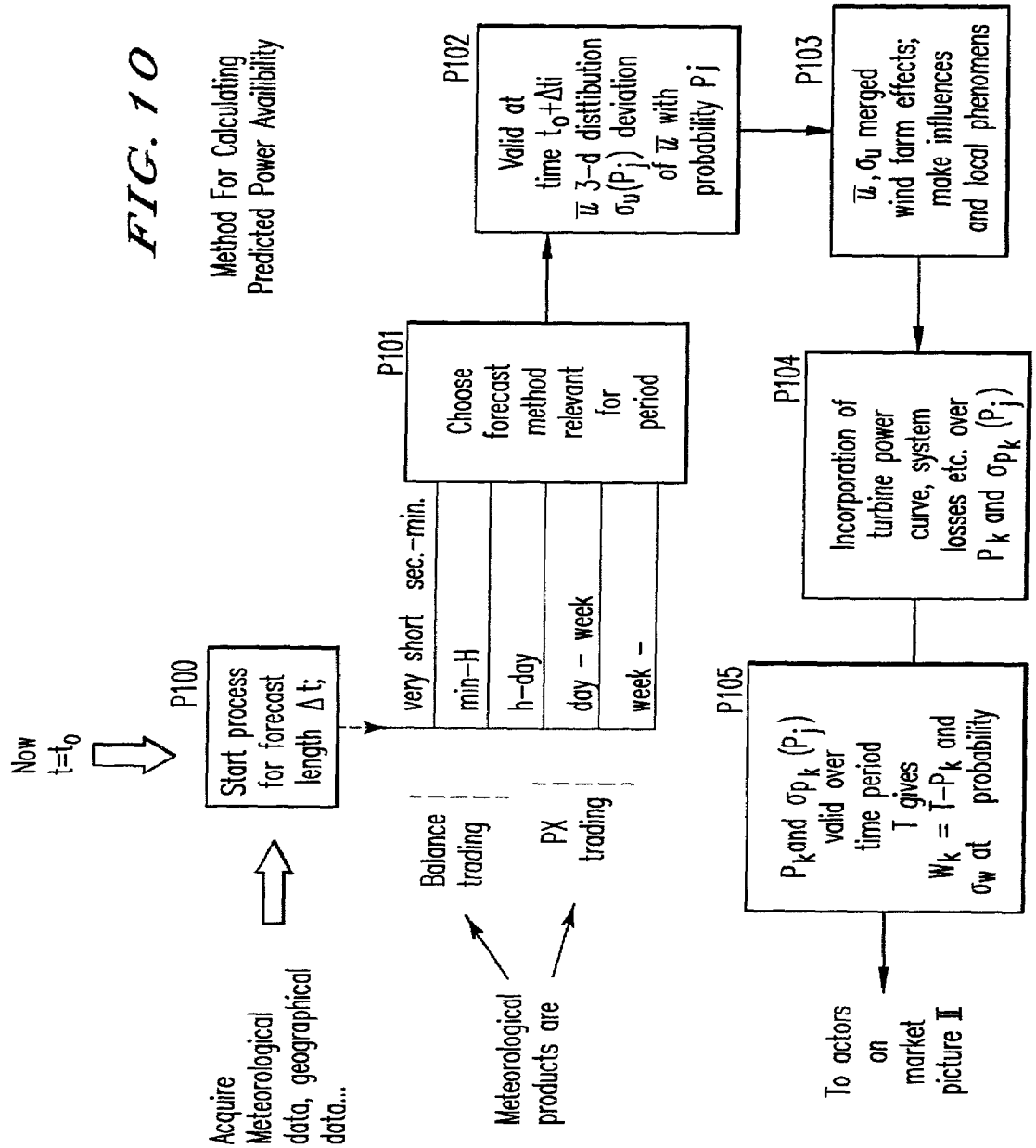
FIG. 10 is a process flow diagram showing how a power prediction may be performed according to the present invention.

In FIG. 10 a loop of the power prediction process is described. Starting at time $t=t_0$, block P100 defines the start of a forecast calculation for a forecast to be valid at time $t=t_0+\Delta t_1$, where $\Delta t_i$ is one of many possible forecast lengths. In this step required meteorological and geographical data is acquired from the global telecommunication system meteorological data flow, or from other sources where relevant data for the given forecast length $\Delta t_i$ is available, such as for very short time-scales e.g. local wind measurements at the turbine site.

In the next step, a decision of forecast method to be used for the presently processed forecast length $\Delta t_1$ is made. As described in U.S. patent application Ser. No. 09/749,999, for very short-term forecasts, on the order of seconds to minutes, methods based on statistical analysis of time series data from nearby located wind sensors statistical may be used. Combination of regression and correlation methods and known probability distributions of the wind itself allows wind-prediction on these short time-scales (e.g. Brown et.al. 1984; Bossanyi, 1985). These distributions and their characteristics are known at many sites and are obtained in real time and updated while a wind farm is operated. The statistical analysis provides both a prediction of a value for the wind and its direction, and an estimate of the uncertainty of the value, i.e. a possible deviation $\sigma_u(P_j)$ at probability level $P_j$.

For short-term forecasting, intervals of minutes to an hour, the prediction may be based on Nowcasting techniques possibly in combination with statistical methods. Nowcasting here refers to methods for objectively analyzing observed meteorological data covering a restricted geographical area (i.e., meso-scale area). Observation techniques may include but not be limited to radar, satellite, balloon or ground-based sensors or other suitable methods. Preferable output of the numerical Nowcasting tools is a three-dimensional time series of data at intervals of minutes. Predictions of available wind for the wind power turbines are obtained from this data by trend fitting using data from the geographic upwind area, data from several time intervals, as well as combined with the influence of the local characteristics as described by atmospheric boundary layer physics. By perturbing the input data of the analysis a spread of predicted values may be obtained. This spread provides information on possible deviation from the predicted value of say wind speed component u. A deviation $\sigma_u(P_j)$ at probability level $P_j$, where level $P_j$ is given by the probability assigned to a given input data perturbation magnitude.

For medium range forecasts on the order of hours to days meteorological synoptic and meso-scale numerical forecast models are used. Together with ensemble prediction methods a measure of the forecast uncertainty is obtained and a value assigned to a deviation $\sigma_u(P_j)$ at probability level $P_j$. By "ensemble prediction methods" the meaning of this term describes methods wherein several numerical forecasts runs are made from, relative to each other, slightly perturbed initial conditions. The non-linearity of the calculated system leads to a spread in predicted values. This is performed by national meteorological centers as part of their operations (e.g. Mendez, 2000; Mylne, 2000).

For long range forecasts, a week or longer, for example, statistics on wind speed and direction are used to produce climatological data, mean value of a variable and the spread around the mean value. Statistics are based on data from the meteorological observation network and sensors mounted on wind turbines. This data may be combined with past numerical forecasting results to fill gaps in the observation network.

Numerical climate simulation models in combination with ensemble forecast methods can be included as a source of information.

Having thus obtained a distribution of the relevant meteorological variable, represented by wind speed ū in block P102, and its deviation $\sigma_u(P_j)$ at probability level $P_j$, the predicted flow field will be altered (block P103 in FIG. 10) as a result of wind farm effects such as wake influences (e.g. Magnusson, 1996). Local flow field corrections may also be needed due to small-scale topographic effects not included in the forecast method used, particularly for the medium range forecasting described above (e.g. Stull, 1988). Multi Variate Data Analysis (MVDA) techniques and/or Neural Network methods may here be used to continuously improve the predictive skill.

With corrections carried out as described the process now moves on to the step wherein the power production of a given turbine is calculated (block P104 in FIG. 10). Knowing the wind speed at hub height, or as an integrated average across the turbine disc, the turbine power curve provides the production. FIG. 9 shows a typical power curve for a pitch-regulated wind turbine from which turbine output power is obtained as function of mean wind speed at hub height. Possible losses in the electrical systems are also considered here.

The sequence of steps covered in blocks P100 to P104 provides a power prediction and a prediction of possible deviations from the predicted value at probability levels $P_j$.

To each meteorological forecast method is coupled a time period T, shorter than the forecast length $\Delta t_i$. This period represents the time window centered at $t=t_0+\Delta t_i$ in which the power production prediction is valid. Multiplying the power prediction with the period T the predicted energy production is obtained for the time window. Deviations $\sigma_{P_k}(P_j)$ of the power production provides in addition deviations of energy production at probability level $P_j$ for the time window, as is schematically shown in block P105.

The data now obtained is ready for transfer to the market actors and may be traded as information valuable for actors on the Power Exchange, PX, as well as for the grid operator. The process starting at block P100 may now be repeated for another forecast length $\Delta t_i$ or if all relevant $\Delta t_i$ are processed be repeated as new meteorological data gets available.

Figure 11:
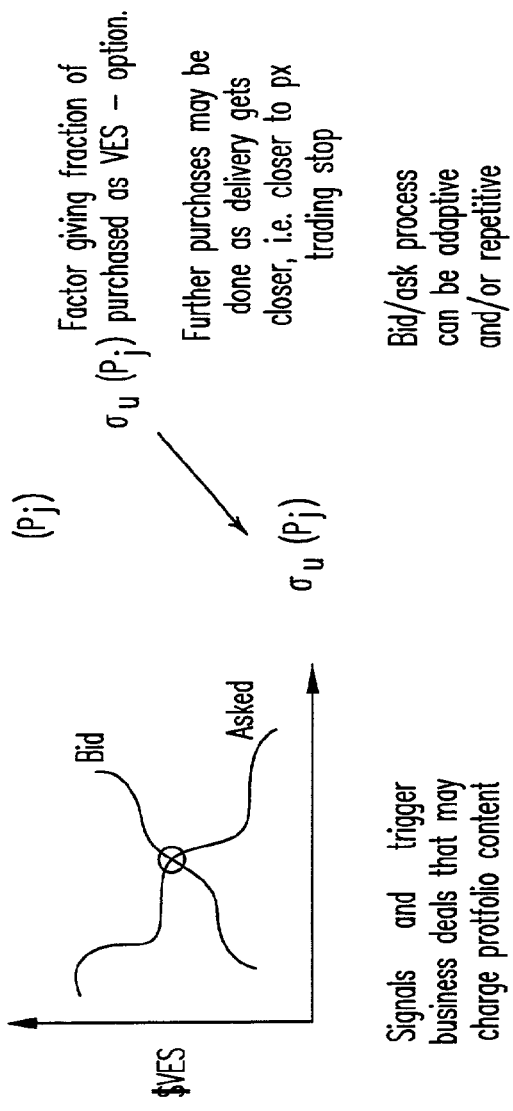
FIG. 11 is a graph showing how energy production and associated deviations may be employed to support virtual energy storage options, and how pricing of these options may be affected.

Having, as described by FIG. 10, obtained a prediction of energy production $W_k$ for a given generator k, and its associated possible deviations $\sigma_{W_k}(P_j)$, FIG. 11 describes how this information is used in the present embodiment to support purchases of Virtual Energy Storage options, VES-options, and how the pricing of these options is affected.

A first step is here summation of production from the generators in a wind farm 1 to obtain the wind farm energy production $W_1$. For each probability level there will also be a possible deviation of wind farm energy production. A possible but not necessary scenario is that for a large deviation at a given probability level a high price level will result since the demand for VES-options will be large. And, conversely, if the predicted deviation level is small. An actor in the trade will now ask for bids on the options market. The actor may ask for a small factor of predicted deviation at a given probability level or choose to ask for a VES-option covering the whole deviation or more. As bids are placed on the market the actor may choose to buy an option if the bid level is acceptable. The financial risk the actor is ready to take influences the decision to buy or not to buy. Further purchases can then be done as the time when PX closes trading gets closer, i.e. as the time to delivery gets closer. The ask/bid process may then be adaptive and/or repetitive.

The signals represented by the farm production $W_1$ and predicted possible deviations $\sigma_1(P_j)$ are here used to trigger business deals that change the content of the actors production portfolio.

Figure 12:
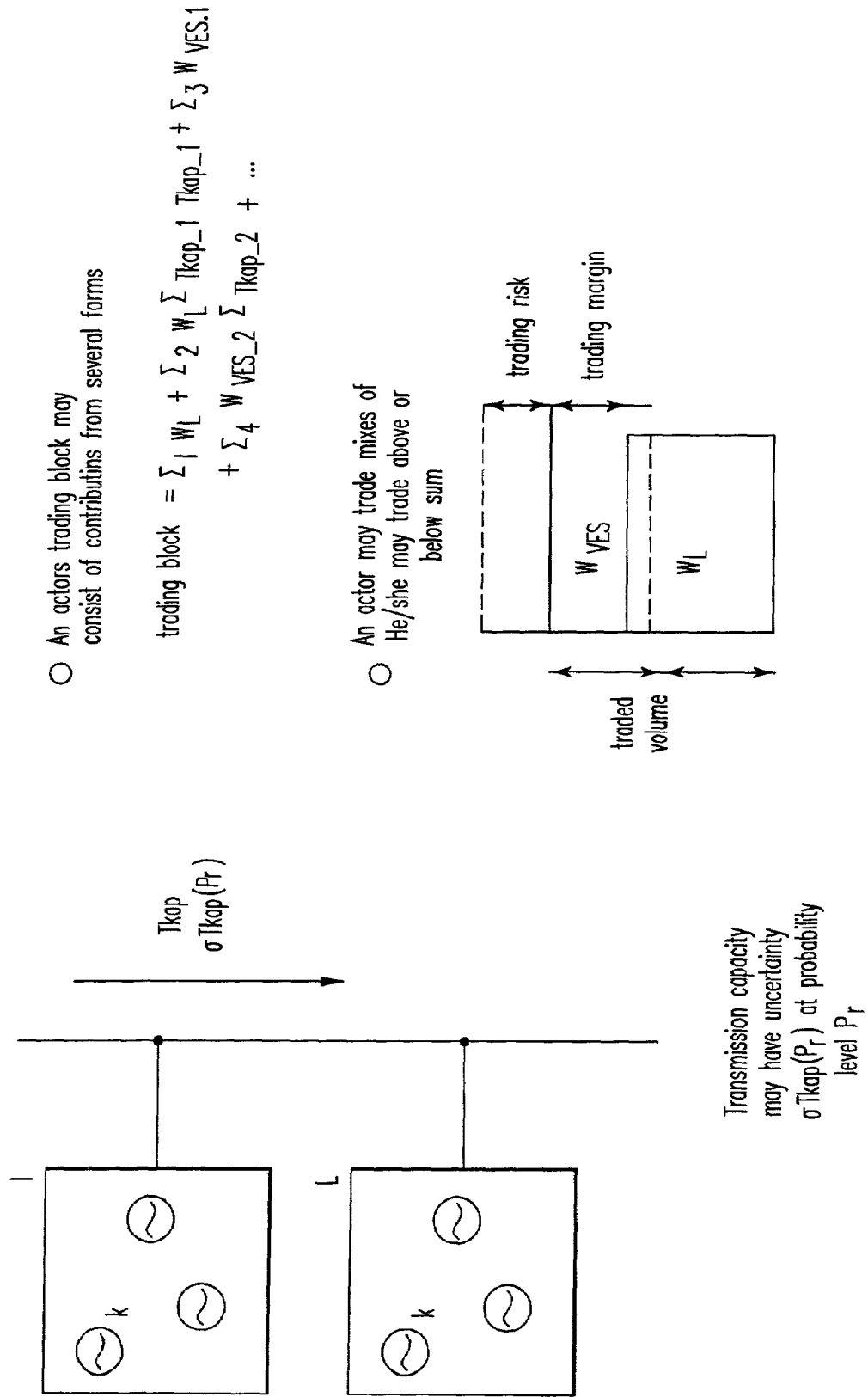
FIG. 12 is a chart showing how an actor may choose to trade a volume that is in a range from below to above the sum of available renewable production.

The actor may as shown in FIG. 12 choose to trade with trading blocks made up of contributions from several renewable power production units and VES-option suppliers. The actor then takes into account limitations in transmission capacity. An actor's trading block is thus of the symbolic form $$W_{trading\_block} = \epsilon_1 W_1 + \epsilon_2 W_L \epsilon_{Tkap\_1} T_{kap\_1} + \epsilon_3 W_{VES\_1} + \epsilon_4 W_{VES\_2} \epsilon_{Tkap\_2} T_{kap\_2} + \ldots,$$

where $\epsilon_1$-$\epsilon_4$ are fractions determining how much of a given units production is included in the trading block, and where the fraction of available transmission capacity secured by contracts or otherwise available for the actor is denoted by $\epsilon_{Tkap\_1}$ and $\epsilon_{Tkap\_2}$. Total transmission capacity in the grid between the production and consumption sites at hand are denoted $T_{kap\_1}$ and $T_{kap\_2}$.

The actor may now choose to trade a volume that is in the range from below to above the sum of predicted available renewable production, in FIG. 12 represented by $W_1$, and purchased VES-options. If the actor chooses a trading volume larger than the sum a trading risk is present since the actor may fail to deliver the full trading volume. A level below the sum of $W_1$ and purchased VES-options provides a trading margin that the actor may use as a marketing argument. By having a policy to always trade such that a certain trading margin is present the actor may claim to be a more reliable producer. This trading margin may for example be used to cope with uncertainties of transmission capacity, in FIG. 12 denoted $\sigma_{Tkap}(P_r)$. $P_r$ being a probability level for a possible deviation in transmission capacity.

Figure 13:
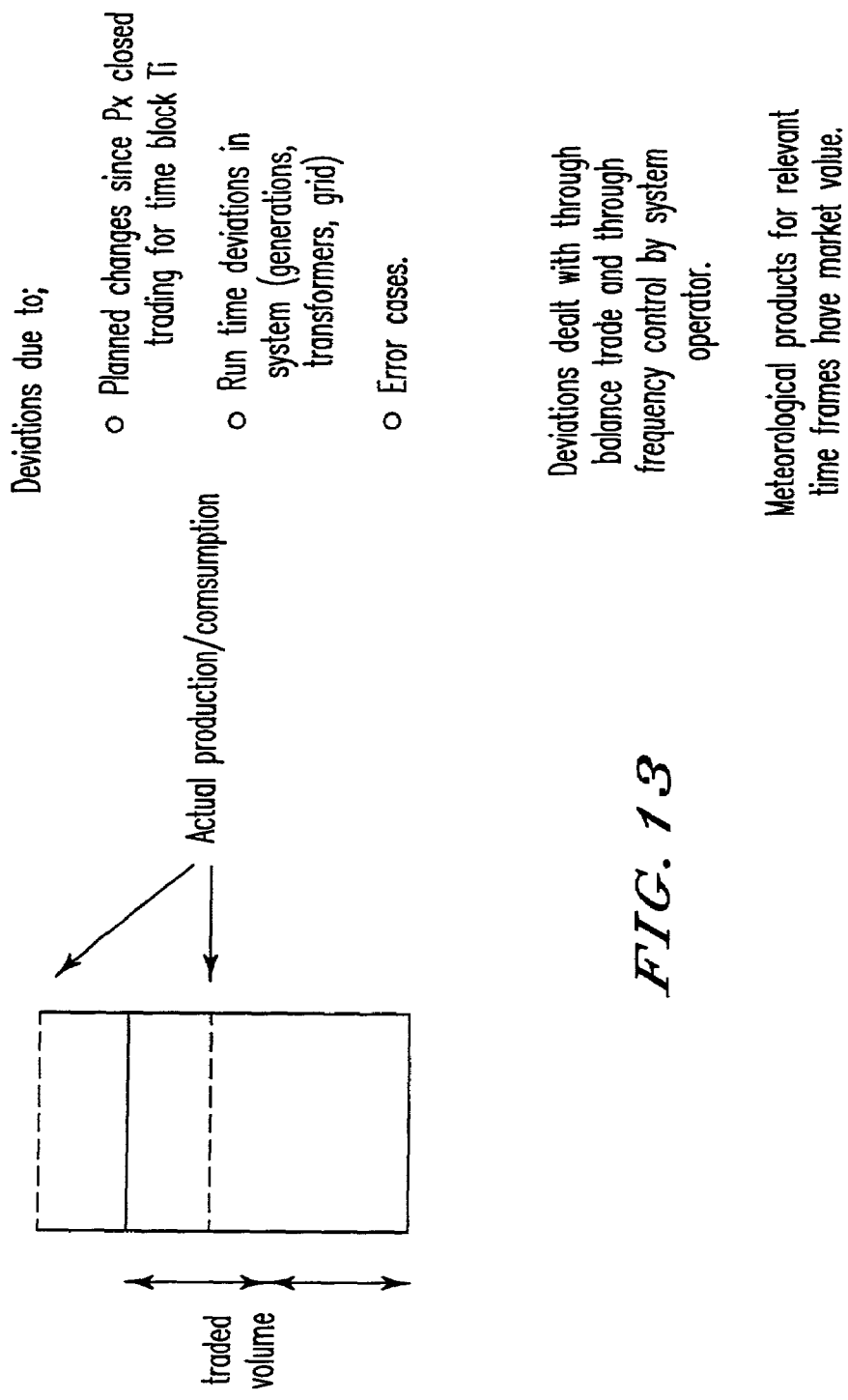
FIG. 13 is a chart showing how an actual power production/consumption level may deviate from what has been settled at the power exchange.

As shown in FIG. 13, the actual production/consumption level may deviate from what has been settled on the power exchange. This may occur through effects such as:

planned changes not known when PX closed trading for the time period at hand, runtime deviations in the system (generators, transformers, grid), error situations, i.e. a component breakdown leading to production or transmission capacity loss.

In the present embodiment of the invention meteorological predictions are identified as having a market value for the grid operator in charge of frequency control, and the operator in charge of balance trading. The value for the power exchange, particularly as fluctuating production from renewable power production units are traded, is key to the part of the embodiment described through FIGS. 10-13.

Figure 14:
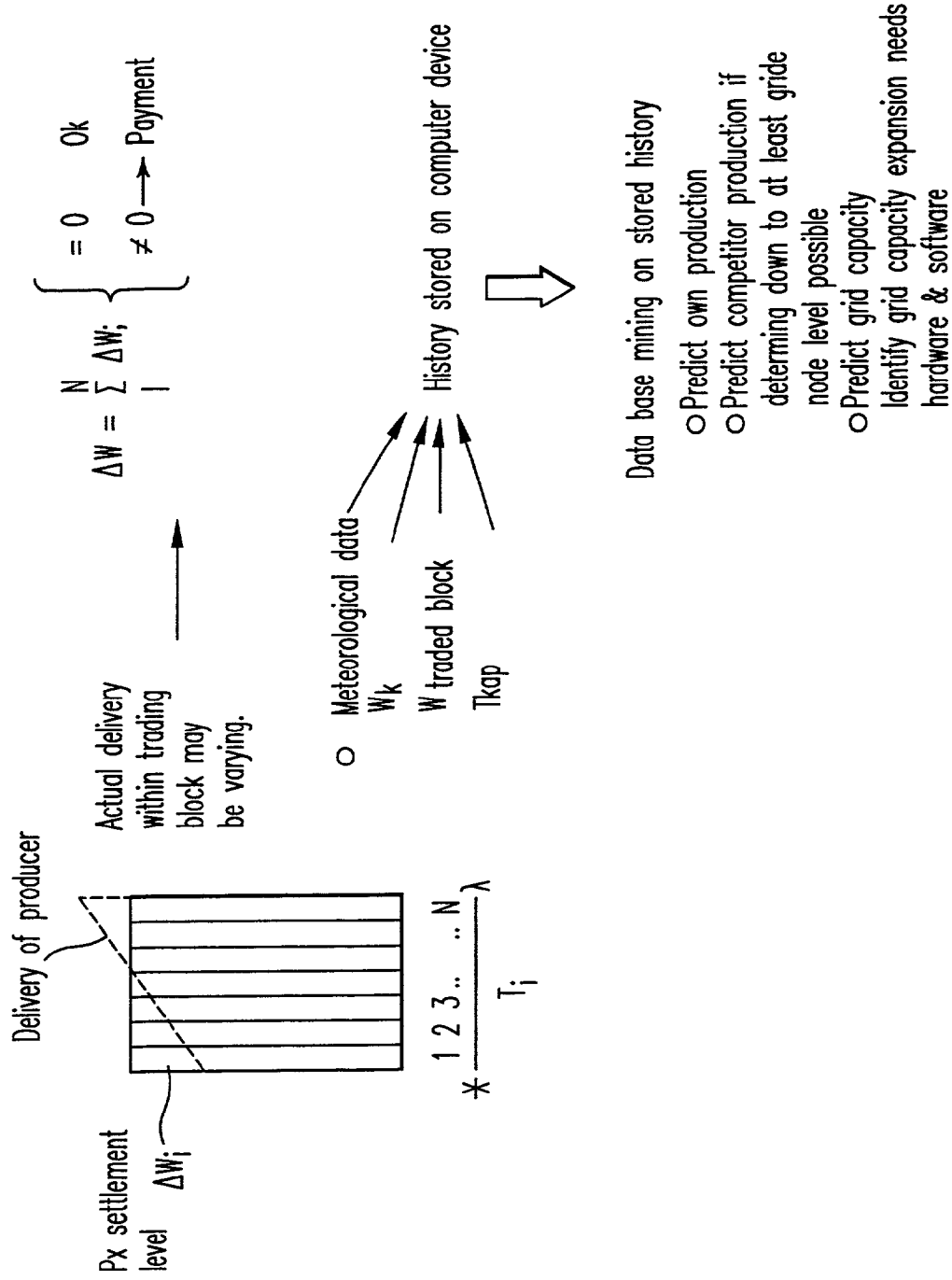
FIG. 14 is a chart showing how historical information regarding meteorological conditions, trading blocks (including delivery records) and transmission capacities may be fused in a data mining operation for supporting various end-uses.
Figure 15:
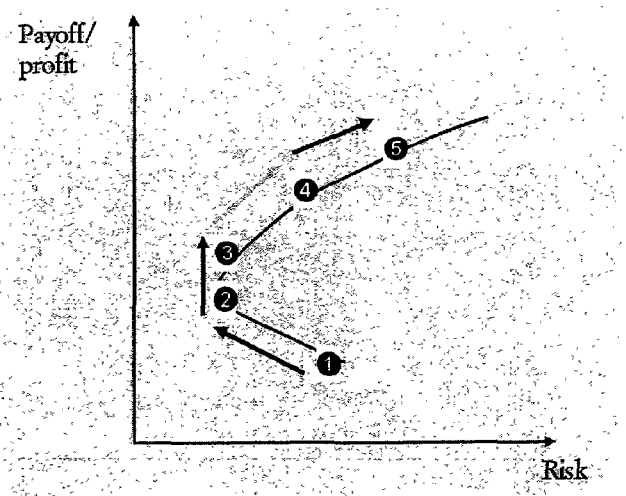
FIG. 15 is a plot of risk willingness relating risk to potential payoff.

Meteorological and geographical data acquired as described in FIG. 10 are in the present embodiment stored on a computer device together with the forecasting results obtained at the end of the chain of activities described in FIG. 14. In the present form of the invention a computerized database is set up such that historical data are archived on these variables as well as the $W_1$ values and the $W_{trading\text{-}block}$ values. Also the transmission capacities $T_{kap}$ are stored in the database. This database is then available for data-mining.

Through the database one may, given the present situation:

predict ones own production, predict a competitors production (if data-mining down to grid node level is possible), leading to a business advantage since the bidding process will be better known beforehand, predict grid capacity, identify grid capacity expansion needs (software as well as hardware).

Obviously, numerous modifications and variations of the present invention are possible in light of the above teachings. From the above description, it will be apparent that the invention disclosed herein provides novel and advantageous methods and mechanisms to operate and control wind turbines, wind farms and their cooperation with the electrical power grid and its takeovers aiming at long term business operations and minimizing risk to all market participants. It will also be apparent that the invention disclosed herein provides other novel and advantageous methods and mechanisms dependent on meteorological information for business activities around wind turbines, wind farms and their co-operation with the electrical power grid and its stakeholders aiming at long-term business operations. For example, some aspects of the procedures can be performed in various ways equivalent to those disclosed herein, e.g., utilizing ganged operation of two or more power producing plants (of at least two kinds, e.g., wind and hydro power, described in U.S. patent application Ser. No. 09/749,999, cited above) and/or point-to-point transmission of wind power-based units of electrical power between two stakeholders, to execute a back-up delivery option or to back-up an erroneous forecast with guaranteed delivery, (upon a direct request, dependent on the meteorological information made available by the present invention), i.e., outside the power exchange. Similar procedures can also be performed on other renewables, such as solar electric power where hydro might be accompanied or substituted by gases that hold energy, or heat storage systems that hold thermal energy. Those gases might be not only a simple source, such as air, which is compressed (potential energy) but also a more complicated source like hydrogen (chemical energy), which is produced by hydrolysis from temporarily available surplus electrical power and which is burned in a gas turbine used as a prime mover, all to stay within "renewables" regime. LNG, liquid natural gas, is of course a strategic option to complement "renewables" to form another type of "hybrid", but still with fairly low environmental impact due to its low carbon content, or more precise low $CO_2$ per kWh. It is therefore to be understood that within the scope of the invention, it may be practiced otherwise than as specifically described herein.

The invention claimed is:

1. A method of translating meteorological forecast data to an operations data associated with providing electrical power produced from a renewable power generation facility to a power grid, comprising:
   collecting meteorological factors that affect an amount of electrical power generated by the renewable power generation facility;
   developing a meteorological forecast from said meteorological factors collected;
   committing to deliver, by contract, at least a portion of a unit of power from said renewable power generation facility at a predetermined time coinciding with the meteorological forecast; and
   developing a trading position for said unit of power based on an uncertainty in said meteorological forecast.

2. The method of claim 1, further comprising:
   calculating a financial risk associated with the commitment to deliver the unit of power at the predetermined time;
   contrasting a cost associated with a risk of failure to deliver the unit of power at the predetermined time with a cost to mitigate said risk of failure; and
   at least one of adjusting and not adjusting said trading position based on an uncertainty in a meteorological reforecast made with an update in said meteorological factors.

3. The method of claim 2, wherein said trading position includes trading an option to offset said uncertainty in said meteorological reforecast.

* * * * *

UNITED STATES PATENT AND TRADEMARK OFFICE
CERTIFICATE OF CORRECTION

PATENT NO.       : 7,430,534 B2                                      Page 1 of 1
APPLICATION NO.  : 10/023899
DATED            : September 30, 2008
INVENTOR(S)      : Lof et al.

It is certified that error appears in the above-identified patent and that said Letters Patent is hereby corrected as shown below:

On the title page, Item (60), the Related U.S. Application Data is incorrect. Item (60) should read:

-- Related U.S. Application Data

(60) Provisional application No. 60/298,142, filed on Jun. 15, 2001. --

Signed and Sealed this

Thirtieth Day of December, 2008

JON W. DUDAS
*Director of the United States Patent and Trademark Office*